United States Patent
Hiiro

(10) Patent No.: US 6,326,580 B1
(45) Date of Patent: Dec. 4, 2001

(54) JOINING APPARATUS

(75) Inventor: Shigeyuki Hiiro, Chiba-ken (JP)

(73) Assignee: Miyachi Technos Corporation, Chiba-ken (JP)

(*) Notice: Subject to any disclaimer, the term of this patent is extended or adjusted under 35 U.S.C. 154(b) by 0 days.

(21) Appl. No.: 09/642,693

(22) Filed: Aug. 22, 2000

(30) Foreign Application Priority Data

Aug. 23, 1999 (JP) ................................. 11-234907
Jan. 18, 2000 (JP) ................................. 12-009315

(51) Int. Cl.[7] ............................................. B23K 11/24
(52) U.S. Cl. ............................. 219/110; 219/91.21
(58) Field of Search ........................... 219/110, 91.21, 219/92, 56.1, 56.21, 56.22

(56) References Cited

U.S. PATENT DOCUMENTS

| | | | |
|---|---|---|---|
| 3,263,059 | * 7/1966 | Rzant | 219/91.21 |
| 4,396,819 | * 8/1983 | Muchkin et al. | 219/91.21 |
| 4,675,494 | * 6/1987 | Dilay | 219/110 |
| 5,866,868 | * 2/1999 | Hirane | 219/110 |

* cited by examiner

Primary Examiner—Clifford C. Shaw
(74) Attorney, Agent, or Firm—Wenderoth, Lind & Ponack, L.L.P.

(57) ABSTRACT

After the initiation of a first current-supplying time an insulator of a coated wired $W_1$ cuts off an electrically conductive path and hence a secondary current $I_2$ for melting and removing the insulator is caused to flow from an upper electrode 20 by way of an intermediate electrode 26. An interior conductor is exposed to form an electrically conductive path leading to workpieces ($W_1$ and $W_2$) between the upper electrode 20 and a lower electrode 22, allowing a branch current $I_B$ to flow into the lower electrode 22. A control unit monitors a current detection signal $<I_B>$ from a current detecting circuit 34. When the signal $<I_B>$ has reached a skip level SK, the control unit terminates the supply of current of a first current-supplying time and initiates the current supply of a second current-supplying time for joining the wire $W_1$ to a terminal member $W_2$.

14 Claims, 15 Drawing Sheets

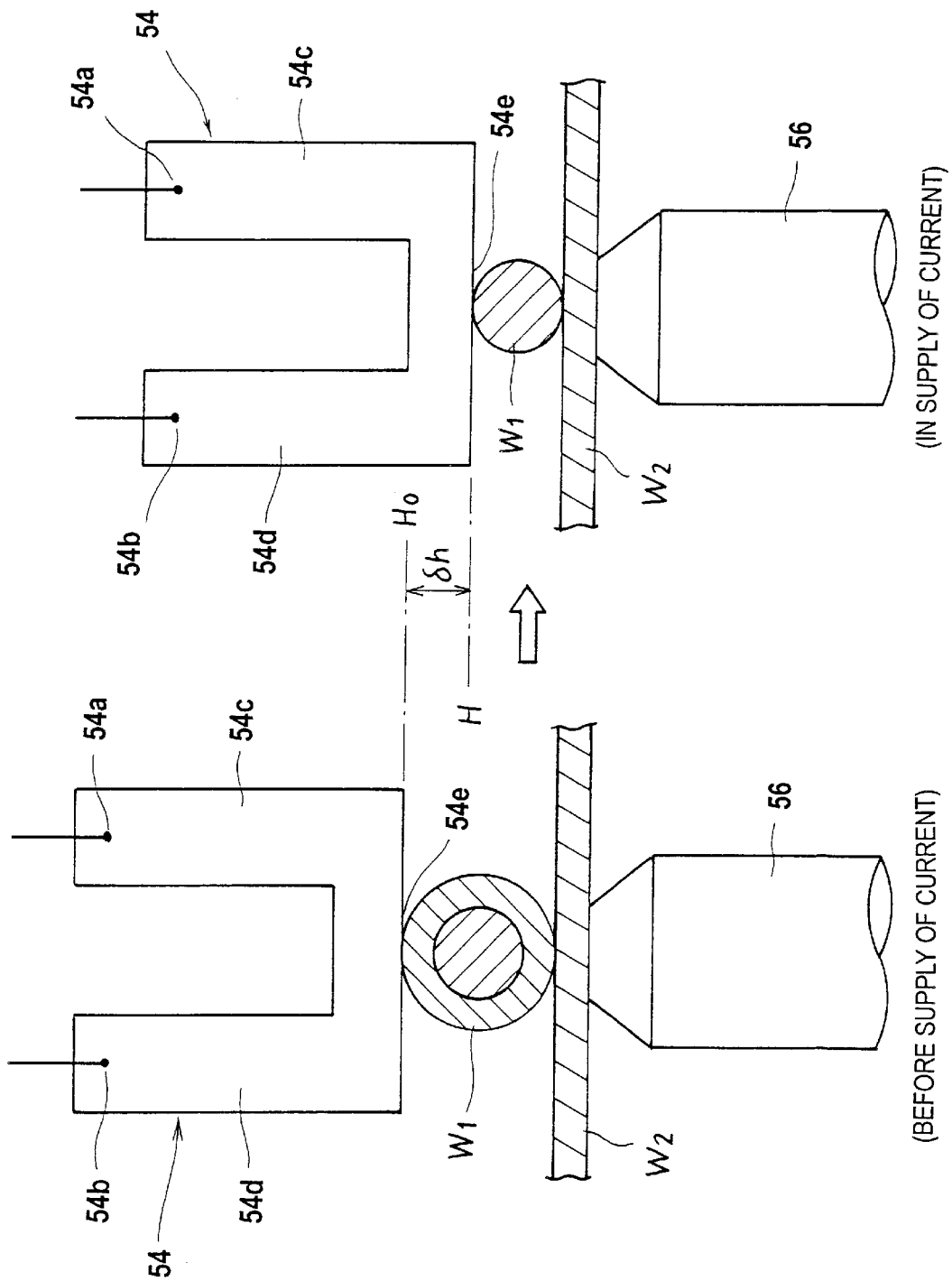

JOINING APPARATUS

BACKGROUND OF THE INVENTION

1. Field of the Invention

The present invention relates to an apparatus for joining a coated wire to a terminal member by supply of current.

2. Description of the Related Art

Coated wires are electric wires each made of a conductor coated with an insulator such as polyimide, polyurethane, enamel or vinyl. Hitherto known is a resistance welding apparatus capable of welding such a coated wire to a terminal member by mere supply of current without subjecting the coated wire to chemical or mechanical pretreatment. This type of resistance welding apparatus comprises a welding head that includes an intermediate electrode interposed between the coated wire and an upper electrode abutting against the coated wire, the intermediate electrode forming an electric bypass leading to a lower electrode abutting against the terminal member.

In such a configuration, the insulator of the coated wire shuts out the current at the initial stage of the supply of current, so that the current flows from the upper electrode through the intermediate electrode bypassing the lower electrode. As a result, the upper and intermediate electrodes (especially, the contact portion between the two electrodes) generate heat by Joule effect, which in turn apply thermal energies to the coated wire. Finally, the insulating film of the coated wire melts and the interior conductor or bare wire become exposed. After the exposure of the coated wire conductor in this manner, the workpieces (coated wire and terminal member) form a part of the electrically conductive path, allowing current to flow between the upper electrode and the lower electrode. The current passing though the workpieces causes the work contact portions to generate heat by Joule effect and fuse and metallurgically join together. Thus, by merely passing current through the welding head, the coated wire insulator is automatically removed so that the coated wire conductor is resistance welded to the terminal member.

Such a conventional resistance welding apparatus has managed (controlled) the main current flowing through the welding head (especially, the upper electrode) and the current-supplying time to have certain values without distinguishing the current used for the melting removing of the coated wire insulator from the current used for the workpiece resistance welding.

However, in spite of a series of steps associated with the same coated wire within the continuous current-supplying time, melting and removing of the insulator and the conductor resistance welding are intrinsically different steps, which are naturally to be given separate optimum current values. In addition, the current-supplying time should also consist of two stages for separate control.

Any means has not been found so far that monitors the current-supplying time (first current-supplying time) required for melting and removing of the insulator, which has made it difficult to manage the current-supplying time (second current-supplying time) for resistance welding to have a desired set value. For this reason, the second current-supplying time and thus the joint quality were influenced by any possible variance of the first current-supplying time. More specifically, too long a first current-supplying time results in too short a second current-supplying time, which impedes the acquisition of a sufficient welding strength. Inversely, when the second current-supplying time becomes too long as a result of short first current-supplying time, there has arisen a drawback that the workpiece joining portions, especially, the coated wire conductor may excessively fuse, which is apt to cause a defective welding due to occurrence of spatters.

SUMMARY OF THE INVENTION

The present invention was conceived in view of such conventional problems. It is therefore the object of the present invention to provide a joining apparatus ensuring an optimum control, in a single current-supplying sequence, of both the current consumed for the removal of the coated wire insulator and the current consumed for the joining of the coated wire conductor, to thereby achieve an improved joint quality.

Another object of the present invention is to provide a joining apparatus capable of executing, at an accurate timing, a switching from the current dedicated to the removal of the coated wire insulator to the current dedicated to the joining of the coated wire conductor.

A further object of the present invention is to provide a joining apparatus having an improved stability in the generation of heat by the electrodes for melting the coated wire insulator.

Yet another object of the present invention is to provide a joining apparatus ensuring an enhanced current-supplying efficiency in the major current supplying after the removal of the coated wire insulator.

Still another object of the present invention is to provide a joining apparatus allowing the flow of stabilized current for the removal of the coated wire insulator by use of heater electrodes.

In order to attain the above objects, according to a first aspect of the present invention there is provided a joining apparatus for joining coated wires each consisting of a conductor covered with an insulator, the apparatus comprising first and second electrodes arranged to clamp the coated wires laid one on top of the other or the coated wire and a terminal member laid one on top of the other, to apply a pressure thereto from both sides; a power supply circuit having first and second output terminals electrically connected to the first and second electrodes, respectively, the power supply circuit supplying a main current to an electrically conductive path extending between the first and second output terminals; a third electrode having a portion in intimate contact with a fore-end of the first electrode, the third electrode electrically connected to the second output terminal of the power supply circuit; current monitoring means monitoring a current flowing through the second electrode and detecting a timing when a current value of the current has reached a predefined level; and current control means providing a control of the power supply circuit so as to allow the main current to be substantially coincident with a first current set value for melting and removing of the insulator during a first current-supplying time starting from the initiation of the supply of current and ending by the detection of the timing, the current control means providing a control of the power supply circuit so as to allow the main current to be substantially coincident with a second current set value for joining the conductor and the terminal member together during a second current-supplying time starting from the detection of the timing and ending by the termination of the supply of current.

In the joining apparatus, the main current is constant current controlled to have a current value suitable to melt and remove the coated wire insulator in the first period that is basically defined as an unfixed period, whereas the current flowing through the second electrode is monitored while allowing the first and third electrodes to generate heat for the melting and removing of the insulator. Then, at the timing when the monitored current has reached a predetermined level (skip level), the supply of current of the first period is terminated and simultaneously the supply of current of the second period is commenced. The second period can be a predefined, certain period, during which the main current is constant current controlled to have a current value suitable to join the coated wire conductor to the terminal member, thereby ensuring a stable and satisfactory joining of members to be welded together.

According to another aspect of the present invention, a system is also possible that monitors the current (bypass current) flowing through the third electrode. In such a case, an appropriate skip level may be set for the amount of drop in the current value of the bypass current. As an alternative, the current flowing through the second electrode in the second period may be the object of constant current control or the controlled amount thereof.

According to a further aspect of the present invention, upon the termination of the supply of current of the first period, the supply of current may once be interrupted for a predetermined duration, and thereafter the supply of current of the second period may be commenced. Such a current-supplying control allows the coated wire insulator to continue to melt by the residual heat even during the interruption time after the termination of the first period current supplying, whereupon the insulator can appropriately and fully be removed before the initiation of the second period current supplying, thus achieving a stabilized resistance welding of the coated wire conductor and the terminal member by the second period current supplying, to contribute to a further improved weld quality.

According to a second aspect of the present invention, there is provided a joining apparatus for joining together a pair of members to be joined that are laid one on top of the other, at least one of the pair of members being a coated wire, the apparatus comprising a power supply circuit having first and second output terminals and supplying a main current to an electrically conductive path extending between the first and second output terminals; a first electrode formed of an electrically conductive, high-heat generating member having first and second terminals electrically connected to the first and second output terminals, respectively, of the power supply circuit, the first electrode having a fore-end between the first and second terminals, the fore-end coming into contact with one of the pair of members to be joined with a predetermined pressurizing force; a second electrode electrically connected to the second output terminal of the power supply circuit and coming into contact with the other of the pair of members to be joined with a predetermined pressurizing force; current monitoring means monitoring a current flowing through a path extending between the second electrode and the second output terminal of the power supply circuit, the current monitoring means detecting a timing when a current value of the current has reached a predefined level; and current control means providing a control of the power supply circuit so as to allow the main current to be substantially coincident with a first current set value for melting and removing of the insulator during a first current-supplying time starting from the initiation of the supply of current and ending by the detection of the timing, the current control means providing a control of the power supply circuit so as to allow the main current to be substantially coincident with a second current set value for joining during a second current-supplying time starting from the detection of the timing and ending by the termination of the supply of current.

In the above configuration, the first electrode coming into press contact with the coated wire is of a single or monolithic type, and hence Joule heat imparted from the electrode extremity to the coated wire is stabilized so that variances in the time required for the melting of the coated wire insulator are reduced. By virtue of the current monitoring means, an accurate timing is acquired of the switching from coated wire insulator removing current to the coated wire conductor joining current. Furthermore, the current monitoring means and the current-supplying control means in cooperation enable an optimum control to be provided to both the current consumed for the coated wire insulator removal and to the current consumed for the coated wire conductor joining, thereby achieving an improved joint quality.

As an alternative of the current monitoring means of the present invention, arrangement may be such that with monitoring of a current flowing between the second terminal of the first electrode and the second output terminal of the power supply circuit, detection is made of the timing when the current value of the current has reached a predefined level.

Preferably, the joining apparatus may further comprise a first switch disposed between the first output terminal of the power supply circuit and the second terminal of the first electrode; a second switch disposed between the second output terminal of the power supply circuit and the second terminal of the first electrode; and switching control means, during the first current-supplying time, keeping the first switch open but the second switch closed, the switching control means, during the second current-supplying time, keeping the second switch open but the first switch closed. Such a configuration is capable of effective utilization, without vainness, of the electrically conductive path of the first electrode not only during the first current-supplying time but also during the second current-supplying time, to thereby enhance the supply efficiency of current used for the joining of the coated wire conductor.

It is also possible for the second aspect joining apparatus to provide a control so as to allow the supply of current to be once interrupted upon the termination of the supply of current of the first period and to be resumed for the second period after the elapse of a predetermined time.

BRIEF DESCRIPTION OF THE DRAWINGS

The above and other objects, aspects, features and advantages of the present invention will become more apparent from the following description when read in conjunction with the accompanying drawings, in which:

FIGS. 15A and 15B depict a variant of a system for acquiring current-supplying mode switching timing in the third embodiment.

DESCRIPTION OF THE PREFERRED EMBODIMENTS

Referring to FIGS. 1 to 5, description will be made of a joining apparatus in accordance with a first embodiment of the present invention.

Figure 1:
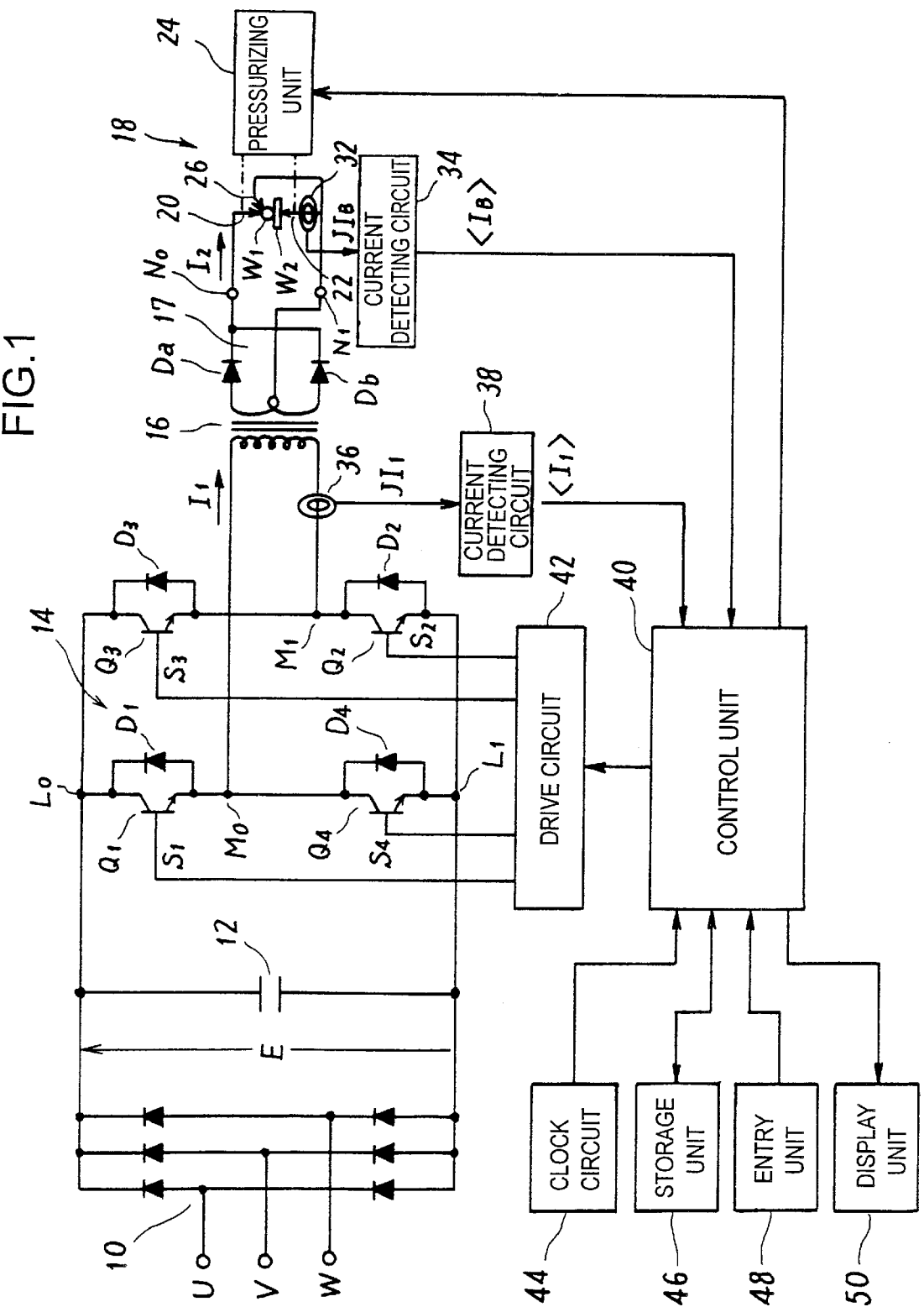
FIG. 1 is a diagram showing a configuration of a joining apparatus in accordance with a first embodiment of the present invention.
Figure 2:
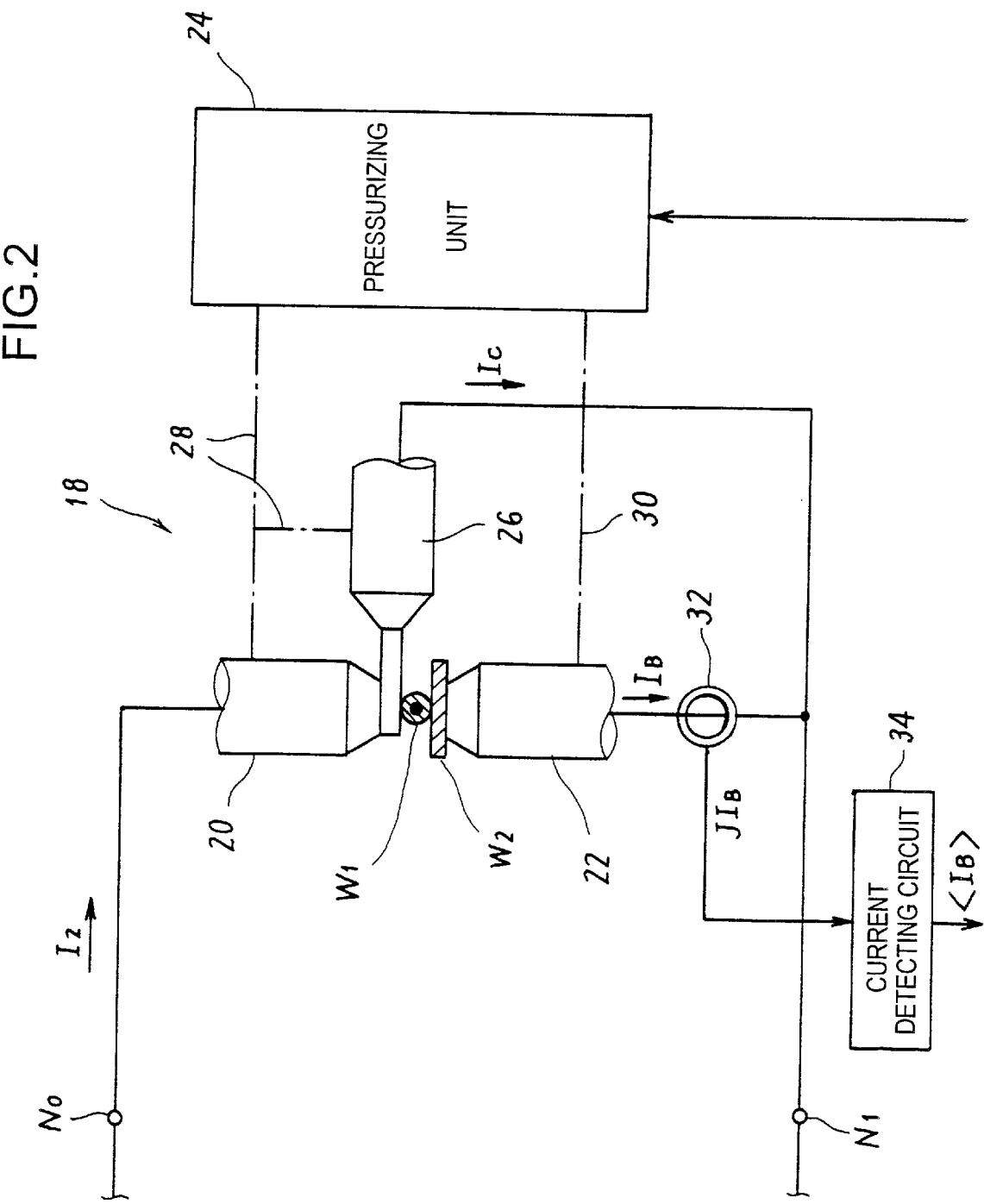
FIG. 2 is an enlarged view of a configuration of a joining head of the joining apparatus in accordance with the first embodiment.

FIG. 1 illustrates the configuration of the joining apparatus according to this embodiment, and FIG. 2 illustrates in an enlarged scale the configuration of a joining head of the joining apparatus.

The joining apparatus of this embodiment employs a power supply circuit in the form of a DC inverter power supply circuit. The power supply circuit comprises an inverter 14 which includes two pairs of (four) unidirectional conducting switching elements $Q_1$, $Q_2$, $Q_3$ and $Q_4$ that are bridge connected to each other, each pair consisting of, e.g., GTRs (giant transistors) or IGBTs (insulated gate bipolar transistors). The switching elements $Q_1$, $Q_2$, $Q_3$ and $Q_4$ are associated in parallel with freewheel diodes $D_1$, $D_2$, $D_3$ and $D_4$, respectively, each diode having the opposite current polarity to that of the corresponding element.

Of the four switching elements, the first set of (positive side) first and second switching elements $Q_1$, and $Q_2$ are simultaneously turned on or off at a time in response to synchronous first and second drive pulses (switching control signals) $S_1$ and $S_2$, respectively, from a drive circuit 42, whilst the second set of (negative side) third and fourth switching elements $Q_3$ and $Q_4$ go on or off at a time in response to synchronous third and fourth drive pulses $S_3$ and $S_4$, respectively, from the drive circuit 42.

The inverter 14 has input terminals ($L_0$ and $L_1$) connected to output terminals of a rectifying circuit 10 and has output terminals ($M_0$, $M_1$) connected to a primary coil of a welding transformer 16. A secondary coil of the welding transformer 16 is connected to input terminals of a rectifying circuit 17 consisting of a pair of diodes $D_a$ and $D_b$, with output terminals $N_0$ and $N_1$ of the rectifying circuit 17 being connected to upper and lower electrodes 20 and 22, respectively, of the joining head generally designated at 18.

As is apparent from FIG. 2, the upper and lower electrodes 20 and 22 of the joining head 18 cooperatively sandwich a coated wire $W_1$ and a terminal member $W_2$ placed one on top of the other therebetween (from above and below) so as to come into press contact with the coated wire $W_1$ and the terminal member $W_2$ under the action of a pressurizing force from a pressurizing unit 24. An intermediate electrode 26 is inserted sideward between the upper electrode 20 and the coated wire $W_1$, with the extremity of the intermediate electrode 26 being in intimate contact with the extremity of the upper electrode 20. The intermediate electrode 26 electrically detours or bypasses the lower electrode 22 and connects to the output terminal $N_1$ of the rectifying circuit 17. Of the three electrodes 20, 22 and 26, the intermediate electrode 26 is made of a high-heat generating conductor, e.g., molybdenum or tungsten alloy and is supported by an upper electrode support member 28 of the pressurizing unit 24. On the other hand, the upper 20 and lower 22 electrodes are both made of a conductor having a high electric conductivity, e.g., copper alloy and are supported by the upper electrode support member 28 and a lower electrode support member 30, respectively, of the pressurizing unit 24.

A current sensor 32 comprised of, e.g., a toroidal coil is attached to a conductive path or a branch line of the lower electrode 22. The current sensor 32 has an output terminal connected to an input terminal of a current detecting circuit 34. When a current $I_B$ flows through the lower electrode 22, the current sensor 32 detects the current $I_B$, and the current detecting circuit 34 issues a current detection signal <$I_B$> indicative of the current value of the current $I_B$. The current detection signal <$I_B$> is fed to a control unit 40.

Referring again to FIG. 1, the rectifying circuit 10 is comprised of a three-phase rectifier circuit consisting of, e.g., six diodes that are three-phase bridge connected to each other. The rectifying circuit 10 serves to convert a three-phase AC voltage of a commercial frequency from three-phase AC power supply terminals (U, V, W) into a DC voltage E of a predetermined level. The DC voltage E output from the rectifying circuit 10 is fed via a smoothing capacitor 12 to the inverter 14.

A current sensor 36 comprised of, e.g., a current transformer is fitted to a conductor extending between the output terminal $M_1$ of the inverter 14 and the primary coil of the welding transformer 16. The current sensor 36 has an output terminal connected to an input terminal of a current detection circuit 38. When a primary current $I_1$ flows through a primary circuit of the welding transformer 16, the current sensor 36 detects the primary current $I_1$ and the current detecting circuit 38 issues a current detection signal <$I_1$> indicative of the current value of the current $I_1$. The current detection signal <$I_1$> is fed to the control unit 40.

The control unit 40 can typically be comprised of a microcomputer (CPU) that provides all computations and controls related to operations of each unit and the entirety of this apparatus. The control unit 40 is associated directly or via an interface circuit not shown with a clock circuit 44, a storage unit 46, an entry unit 48 a display unit 50, etc.

The clock circuit 44 feeds to the control unit 40 a basic clock pulse φ of e.g., 10 kHz defining a basic cycle of switching operations of the inverter 14. The storage unit 46 includes a ROM and a RAM. The ROM stores therein various programs defining computation processing operations of the control unit 40 and the RAM stores therein various measurement value data, computation data, etc. The entry unit 48 includes various keys disposed on a console panel of the apparatus unit, and an input/output interface circuit that is connected via a communication cable to an external device. The display unit 50 includes a display, lamps, etc., disposed on the console panel of the apparatus unit.

In this joining apparatus, various welding condition data are entered through the entry unit 48 and are stored in the storage unit 46. One of particularly key points in setting of welding conditions of this embodiment is that the entire current-supplying time is segmented into a first current-supplying time $WE_1$ for melting and removing the insulator of the coated wire $W_1$ and a second current-supplying time $WE_2$ for welding the conductor of the coated wire $W_1$ to the terminal member $W_2$, with the first $WE_1$ and second $WE_2$ current-supplying times being separately given different current values.

In this case, the first current-supplying time $WE_1$ is uncertain, with its upper limit time $WE_1'$ defined for melting and removing of the insulator of the coated wire $W_1$. The second current-supplying time $WE_2$ commences simultaneously with the termination of the first current-supplying time $WE_1$. The apparatus of the present invention is capable of securely detecting the timing to terminate supply of current of the first current-supplying time $WE_1$ as will be described later, with the result that it can make a management of the current-supplying initiation timing of the second current-supplying time $WE_2$ so that the duration of the $WE_2$ can be controlled as having previously been set. This enables the second current-supplying time $WE_2$ to be set to the current-supplying time suitable to join the conductor of the coated wire $W_1$ to the terminal member $W_2$.

The set current value of the first current-supplying time $WE_1$ is selected to be a current value SIa suitable to melt and remove the insulator of the coated wire $W_1$ in the desired time required. On the other hand, the set current value of the second current-supplying time $WE_2$ is selected to be a current value SIb suitable to weld the conductor of the coated wire $W_1$ to the terminal member $W_2$ in the current-supplying time $WE_2$.

It is to be understood that the joining as used in this embodiment includes a mode of joining the coated wire $W_1$ to the terminal member $W_2$ by means of resistance welding and a mode of joining the coated wire $W_1$ to the terminal member $W_2$ by means of soldering after having solder plated or tinned the joint surface of the terminal member $W_2$.

Another key set value in this embodiment is a skip level SK to be set for the lower electrode current $I_B$ through the joining head 18, for detecting the termination point of the first current-supplying time $WE_1$. The lower electrode current $I_B$ rises in proportion to the progress of the melting and removing of the insulator of the coated wire $W_1$. The skip level SK can be selected to be an appropriate level in mid-course of the rise of the lower electrode current $I_B$.

Figure 3:
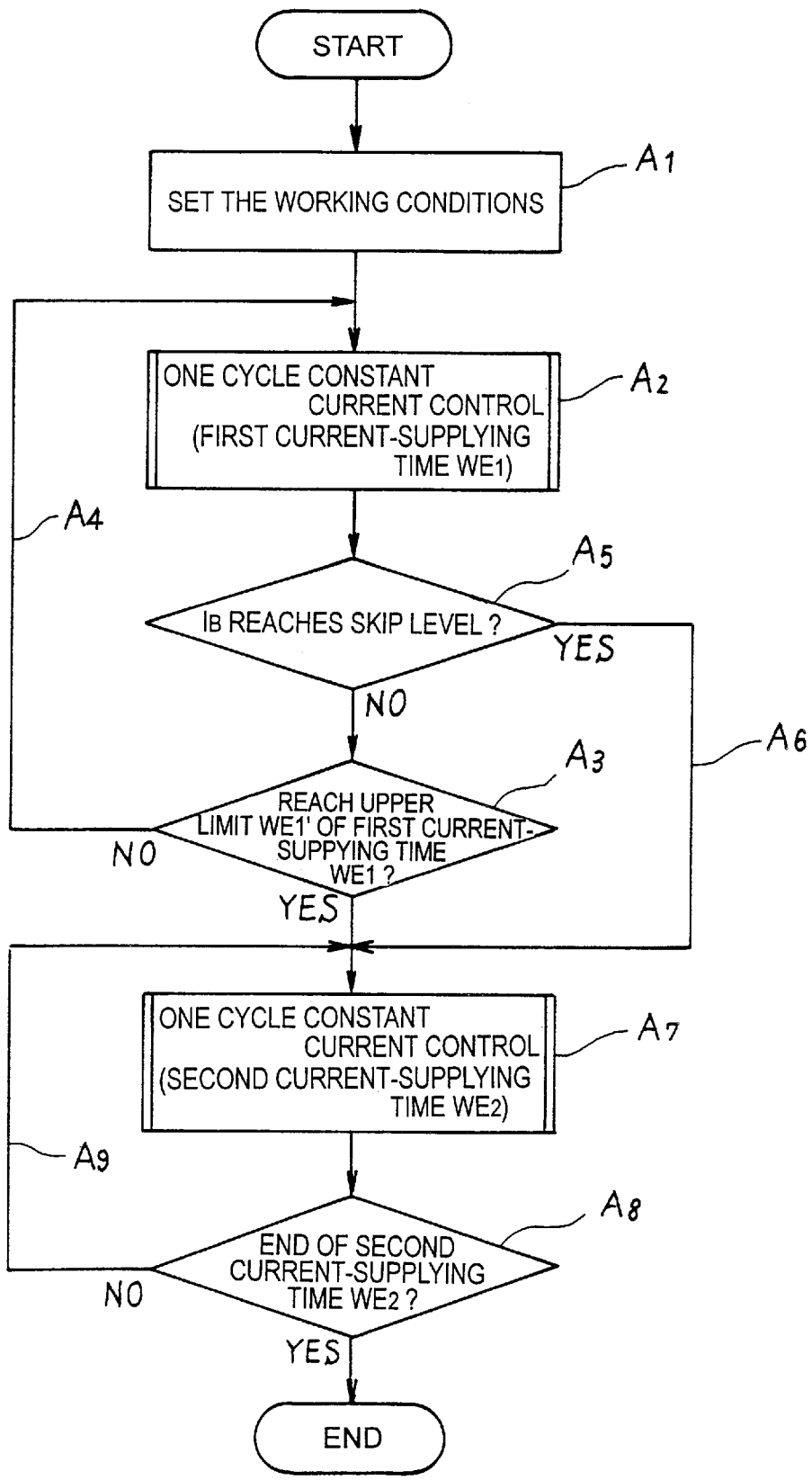
FIG. 3 is a flowchart of a procedure of a current-supplying control effected in the first embodiment.
Figure 4:
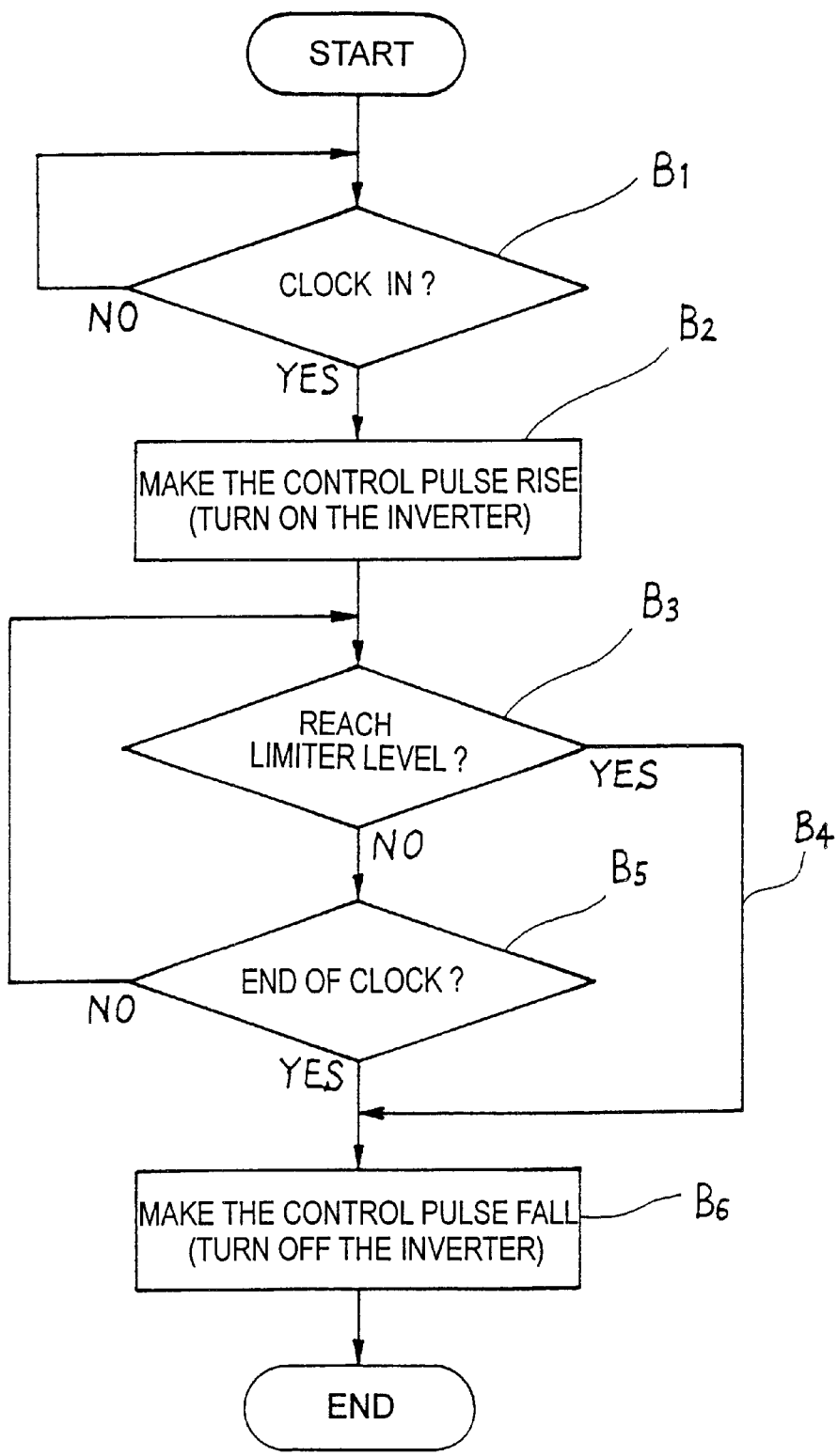
FIG. 4 is a flowchart of a processing procedure of a constant current limiter control system effected in the first embodiment.

Referring then to FIGS. 3 to 5, description will be made of a current-supplying control system effected in the joining apparatus of this embodiment.

Figure 5A:
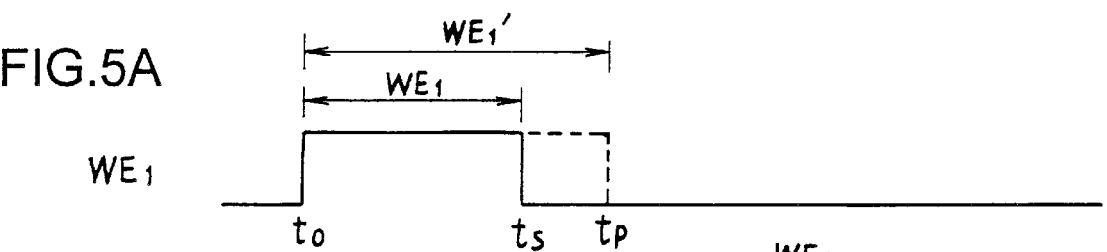
FIGS. 5A to 5D depict waveforms of a secondary current (main current) and a lower electrode current (branch current) appearing in the first embodiment.
Figure 5B:
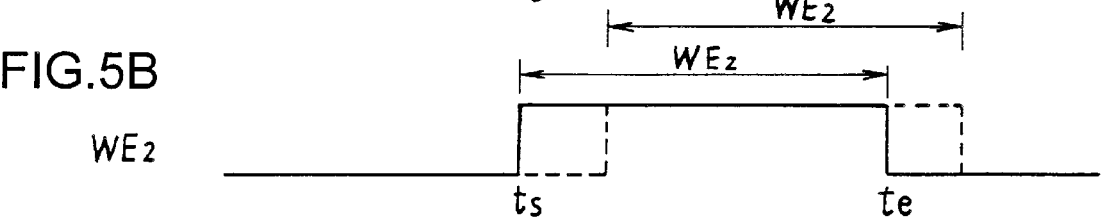
Figure 5C:
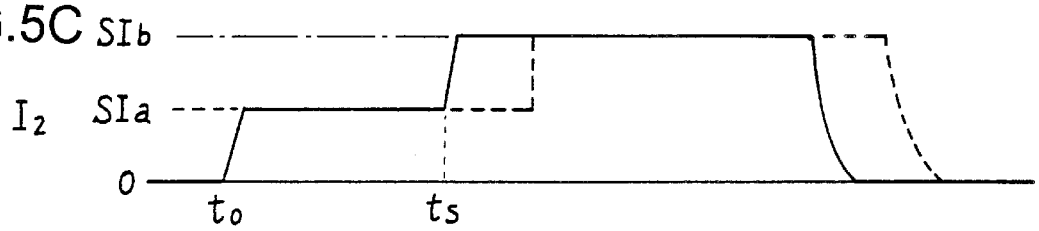
Figure 5D:
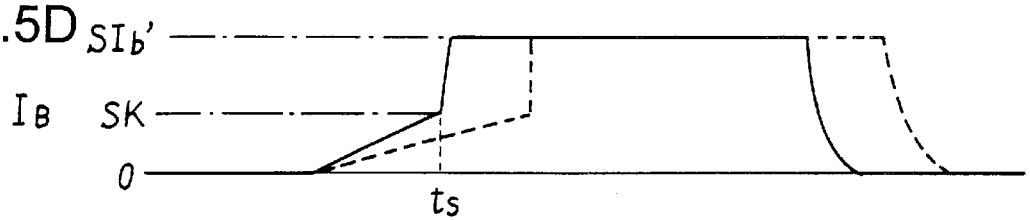

FIG. 3 shows a procedure of current-supplying control provided by the control unit 40 for joining the coated wire $W_1$ to the terminal member $W_2$, and FIG. 4 shows a processing procedure of a constant current limiter control system. FIGS. 5C and 5D depict waveforms of a secondary current (main current) $I_2$ and the lower electrode current (branch current) $I_B$, respectively, flowing through the secondary circuit of the coated wire joining apparatus.

A predetermined start signal is fed from an external device not shown after insertion of the workpieces ($W_1$ and $W_2$) among the upper 20, intermediate 26 and lower 22 electrodes of the joining head 18. In response to the start signal, the control unit 40 first allows the pressurizing unit 24 to start an exertion of electrode force, after which it commences a current-supplying sequence.

Previous to commencement of the current-supplying sequence, the control unit 40 reads set values of various working conditions from the storage unit 46 and sets them in respective predetermined registers (step $A_1$).

A constant current control is then provided to execute supply of current of the first current-supplying time $WE_1$ (step $A_2$). The constant current control can be e.g., a feedback constant current limiter control and use as a feedback signal a current detection signal <$I_1$> from the current sensor 36 and the current detection circuit 38.

The constant current limiter control system is shown in FIG. 4. Upon receipt of a clock $\phi$ (step $B_1$), the control unit 40 allows control pulses $S_1$ and $S_2$ to go high at the leading edge of that clock cycle by way of the drive circuit 42, turning ON the first set of switching elements $Q_1$ and $Q_2$ (step $B_2$). At that time, the control pulses $S_3$ and $S_4$ remain low, keeping the second set of switching elements $Q_3$ and $Q_4$ OFF. When the first set of switching elements $Q_1$ and $Q_2$ are turned ON, the primary current $I_1$ rises up in the positive direction.

Once the primary current $I_1$ rises up normally, the current detection signal <$I_1$> reaches in that clock cycle a predetermined limiter level corresponding to a set current value SIa for the first current-supplying time $WE_1$. At the limiter level arrival point, the control unit 40 allows the control pulses $S_1$ and $S_2$ to go low, turning OFF the first set of switching elements $Q_1$ and $Q_2$ (step $B_3 \rightarrow B_4 \rightarrow B_6$).

Attributable to variances such as an increase in the resistance value of the secondary circuit or a drop in the three-phase AC power supply voltage, the primary current $I_1$ may not satisfactorily rise up, so that the current detection signal <$I_1$> may not reach the limiter level in that clock cycle. In such an event, the control unit 40 causes the control pulses $S_1$ and $S_2$ to fall at the trailing edge of the clock $\phi$, turning OFF the first set of switching elements $Q_1$ and $Q_2$ (steps $B_5 \rightarrow B_6$).

In the next clock cycle, the control unit 40 inverts the polarity and provides a switching control of the second set of switching elements $Q_3$ and $Q_4$ while keeping the first set of switching elements $Q_1$ and $Q_2$ OFF. The above procedure is then iterated. Thus, with the polarity switched for each clock cycle, the switching elements ($Q_1$, $Q_2$), ($Q_3$, $Q_4$) of the inverter 14 are subjected to the limiter control system switching control (steps $A_2 \rightarrow A_3 \rightarrow A_4 \rightarrow A_2$ . . . )

Such constant current limiter based switching operations of the inverter 14 allow a DC secondary current $I_2$ having a current value substantially equal to the set current value SIa to flow through the secondary circuit.

In the joining head, immediately after the initiation of the first current-supplying time $WE_1$, the secondary current $I_2$ from the upper electrode 20 flows by way of the intermediate electrode 26 due to the interruption of the conductive path by the insulator of the coated wire $W_1$. This means that the entire secondary current $I_2$ results in a branch current or bypass current $I_C$ flowing through the intermediate electrode 26. This secondary current 12 or bypass current $I_C$ generates Joule heat in the upper 20 and intermediate 26 electrodes, particularly, in the region of contact of the two electrodes, the resultant heat applying a heat to the insulator of the coated wire $W_1$.

When the insulator of the coated wire $W_1$ is melted and removed as a result of this application of heat, the interior conductor becomes exposed. A conductive path is then formed through the workpieces ($W_1$, $W_2$) between the upper electrode 20 and the lower electrode 22, so that a part of the secondary current $I_2$ flows through the conductive path into the lower electrode 22.

When the lower electrode current $I_B$ passing through the workpieces ($W_1$, $W_2$) starts to flow, the melting and removing of the coated wire insulator is accelerated by Joule heat generated by the workpieces themselves, leading to an increase of the lower electrode current $I_B$.

The control unit 40 continues to monitor the value of the current detection signal <$I_1$> fed from the current detecting circuit 34 from the initiation (point to) of the first current-supplying time $WE_1$, and, at point $t_s$, when <$I_1$> reaches (exceeds) the skip level SK, terminates the supply of current of the first current-supplying time $WE_1$ and simultaneously commences the supply of current of the second current-supplying time $WE_2$ (steps $A_5 \rightarrow A_6 \rightarrow A_7$).

During the supply of current of the second current-supplying time $WE_2$, switching is made to the set current value [SIb] for net joining so that the inverter 14 can experience the switching actions under the constant current limiter control (step $A_7$) similar to the above. The supply of current of the second current-supplying time $WE_2$ continues as defined by the set time. Thus, substantially a constant current flows during the set time through the portion of contact of the coated wire $W_1$ conductor with the terminal member $W_2$, so that stable and satisfactory joining of workpieces ($W_1$, $W_2$) can be achieved.

In case the coated wire $W_1$ insulator is hard to melt due to any causes in the first current-supplying time $WE_1$ and the lower electrode current $I_B$ cannot reach the skip level SK in spite of elapse of the upper limit time $WE_1'$ from the initiation of the supply of current, the operation is abandoned at that point (time tp) and the supply of current of the first current-supplying time $WE_1$ is terminated with the switching to the supply of current of the second current-supplying time $WE_2$ (steps $A_3 \rightarrow A_7$).

As described above, the coated wire joining apparatus of this embodiment provides a constant current control of the secondary current $I_2$ so as to result in a current value suitable to melt and remove the insulator of the coated wire $W_1$ in the first current-supplying time $WE_1$ that is basically defined as an uncertain period, to thereby generate heat for the insulator melting and removing in the upper 20 and intermediate 26 electrodes, while monitoring the branch current $I_B$ flowing through the lower electrode 22. Then, at the timing when the branch current $I_B$ reaches the predetermined skip level SK, the supply of current of the first current-supplying time $WE_1$ is terminated and at the same time the supply of current of the second current-supplying time $WE_2$ is commenced. The second current-supplying time $WE_2$ is a preset, fixed period during which the secondary current $I_2$ can be constant current controlled so as to result in a current value suitable to join the coated wire $W_1$ conductor to the terminal member $W_2$, thereby achieving a stable and satisfactory joining of the workpieces ($W_1$, $W_2$).

Optimum control can thus be provided of both the current consumed for the removal of the coated wire $W_1$ insulator and the current consumed for the joining of the coated wire $W_1$ conductor in a single current-supplying sequence, thereby achieving an improved joint quality.

In the above embodiment, the branch current $I_B$ flowing through the lower electrode 22 has been monitored in order to judge the degree of progress of the melting and removing of the coated wire $W_1$ insulator during the first current-supplying time $WE_1$. Instead, a system of monitoring the bypass current $I_C$ flowing through the intermediate electrode 26 would also be possible. In this case, an appropriate skip level may be set for the amount of drop in the current value of the bypass current $I_C$.

In the above embodiment, the secondary current $I_2$ was the object of control or the controlled amount in the constant current control during the supply of current of both the first and second current-supplying times $WE_1$ and $WE_2$. It would however also be possible in the second current-supplying time $WE_2$ to employ the lower electrode current $I_B$ as the controlled amount in lieu of the secondary current $I_2$. The constant current control system in such a case could be an error comparison pulse width control system in which comparison is made between a measured value (effective value or average value) of the lower electrode current $I_B$ and a set current value for each cycle of the inverter frequency, to thereby acquire an error based on which the pulse width of the control pulse in the next cycle is determined. It will be noted that the control unit 40 may include the constant current control unit in the form of a dedicated hardware circuit.

Although the above embodiment has employed the current detection value of the primary current $I_1$ as the feedback signal, a current sensor may be disposed at the output side of the rectifying circuit 17 in the secondary circuit so that the current detection value of the secondary current $I_2$ can be used as the feedback signal for the constant current control.

Another variant of the above embodiment could be a system having a switch not shown in the bypass circuit of the intermediate electrode 26, the switch being closed (ON) during the first current-supplying time $WE_1$ and opened (OFF) during the second current-supplying time $WE_2$. In this case, all of the secondary current $I_2$ flows into the lower electrode 22 during the second current-supplying time $WE_2$, and hence $I_2 = I_B$ results.

In the current-supplying control described above, once the current flowing through the lower electrode 22 or the intermediate electrode 26 reaches a predetermined skip level SK during the first current-supplying time $WE_1$, the supply of current of the first current-supplying time $WE_1$ has been terminated at that point $t_s$ while simultaneously commencing the supply of current of the second current-supplying time $WE_2$.

Figure 6:
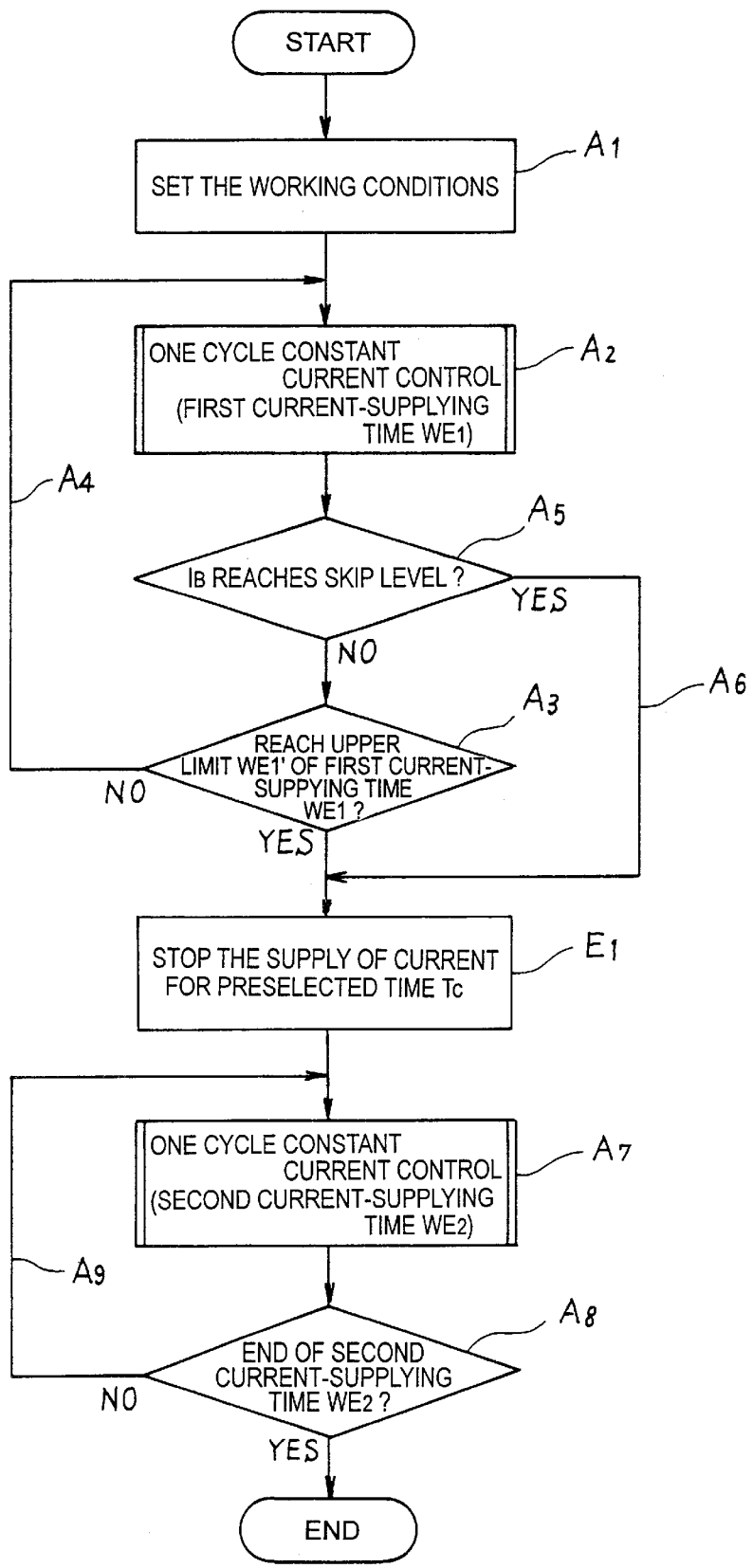
FIG. 6 is a flowchart of another procedure of the current-supplying control effected in the first embodiment.
Figure 7A:
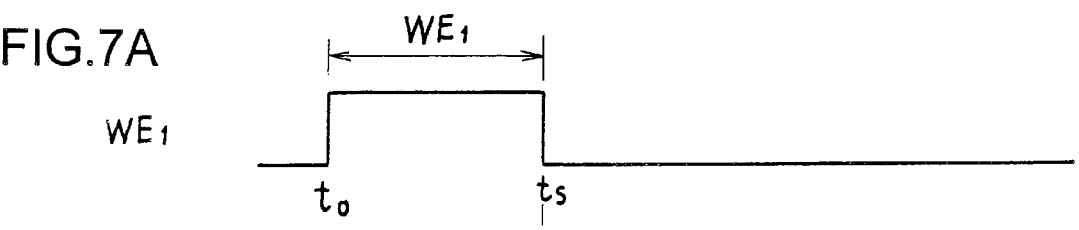
FIGS. 7A to 7D depict waveforms of the secondary current (main current) and the lower electrode current (branch current) appearing in the first embodiment.
Figure 7B:
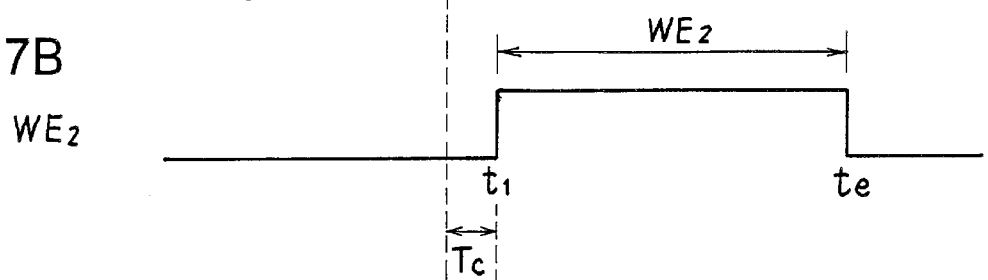
Figure 7C:
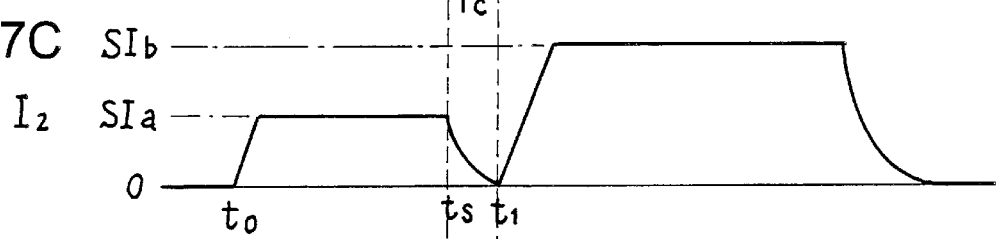
Figure 7D:
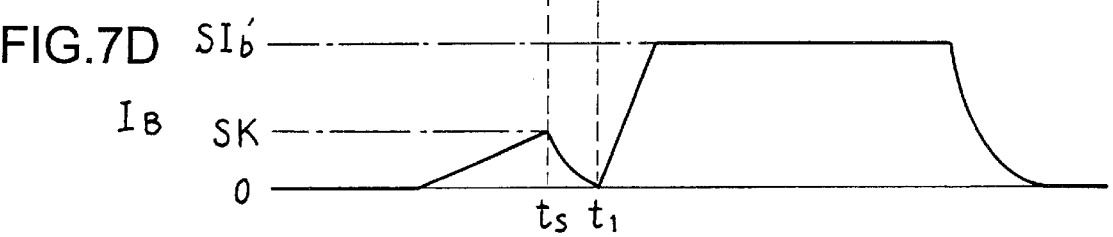

As depicted in FIGS. 6 and 7, however, after the termination of the supply of current of the first current-supplying time $WE_1$ at the skip level arrival point $t_s$, the supply of current may once be suspended during a preset time $T_c$ (step $E_1$) and the supply of current of the second current-supplying time $WE_2$ may be commenced after the elapse of the OFF time $T_c$.

By virtue of such a temporary suspension of the supply of current of the first current-supplying time $WE_1$, the insulator of the coated wire $W_1$ continues to melt by its residual heat but is simultaneously cooled so that the insulator can appropriately and fully be removed and cooled before the commencement of the supply of current of the second current-supplying time $WE_2$. This will contribute to a stabilized resistance welding of the coated wire $W_1$ conductor to the terminal member $W_2$ by the supply of current of the second current-supplying time $WE_2$. This will also prevent excessive fusion and possible ignition of the coated wire to achieve an improved weld quality.

Figure 8:
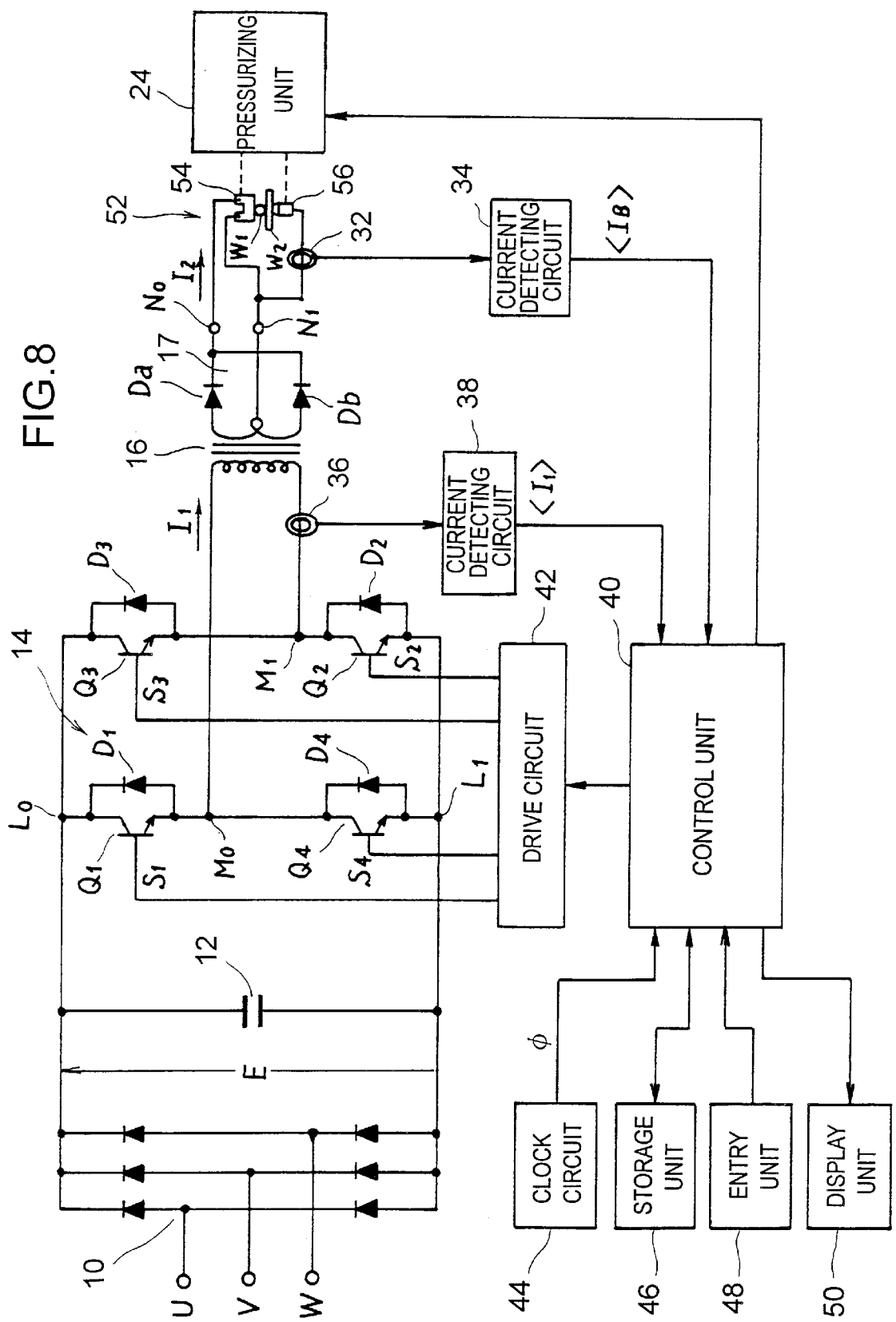
FIG. 8 illustrates a configuration of a joining apparatus in accordance with a second embodiment of the present invention.
Figure 9:
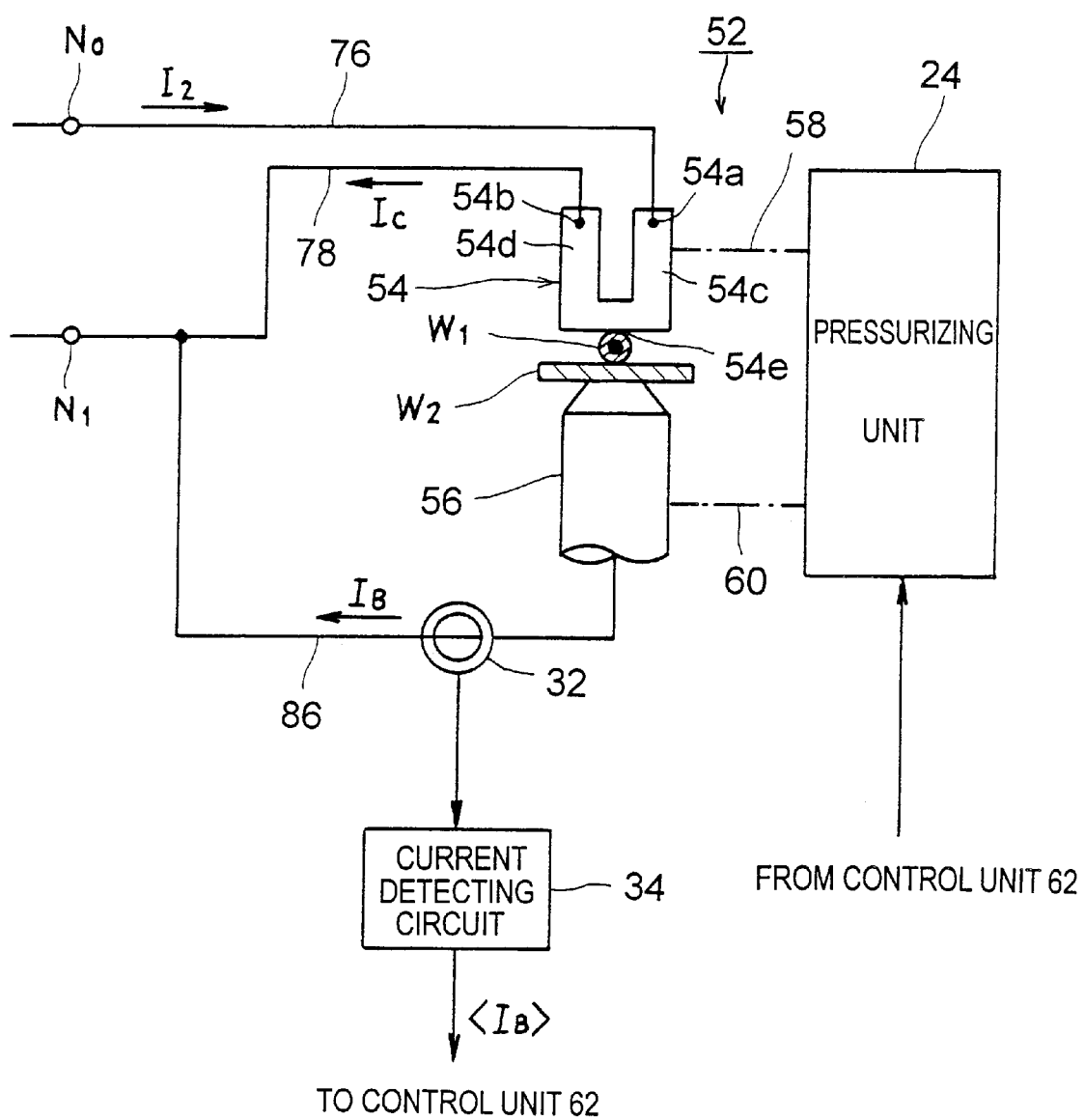
FIG. 9 is an enlarged view of a configuration of a joining head of the joining apparatus in accordance with the second embodiment.
Figure 10:
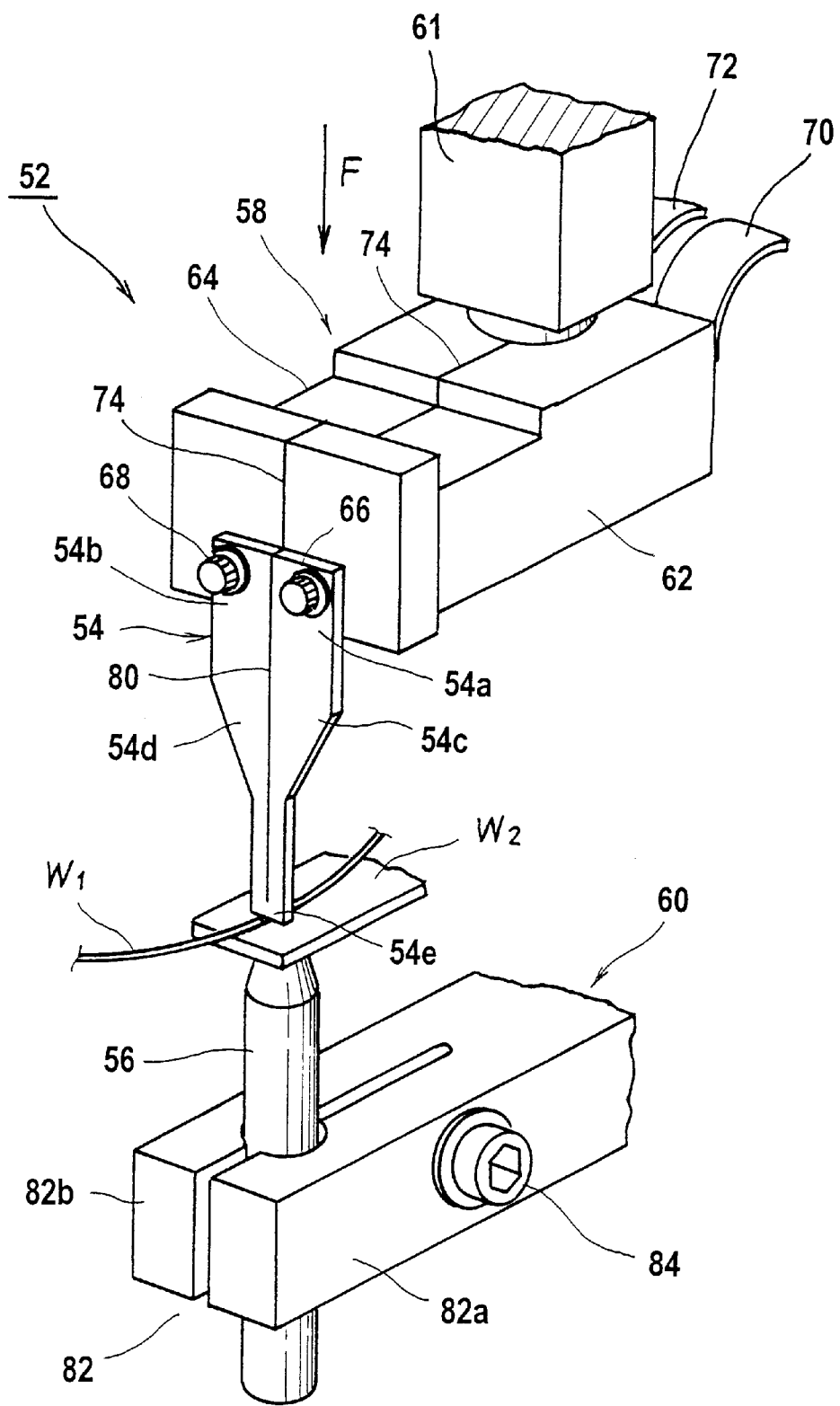
FIG. 10 is a perspective view of a specific example of a configuration of the joining head in accordance with the second embodiment.

Referring then to FIGS. 8 to 10, a second embodiment of the present invention will be described. FIG. 8 illustrates the configuration of a joining apparatus in accordance with this embodiment, and FIG. 9 illustrates in an enlarged scale the configuration of a joining head of the joining apparatus. In the diagrams, same reference numerals are imparted to parts having similar configurations or functions to those in the first embodiment described above.

In the joining apparatus of this embodiment, the rectifying circuit 17 has output terminals, namely, power supply output terminals $N_0$ and $N_1$ electrically connected to upper and lower electrodes 54 and 56 of the joining head generally designated at 52. More specifically, the power supply output terminal $N_0$ on the positive voltage side is connected to a first terminal 54a of the upper electrode 54 whilst the power supply output terminal $N_1$ on the zero potential side is connected to the lower electrode 56 and a second terminal 54b of the upper electrode 54.

As is apparent from FIG. 9, the upper and lower electrodes 54 and 56 of the joining head 52 cooperatively sandwich a coated wire $W_1$ and a terminal member $W_2$ placed one on top of the other therebetween (from above and below) so as to come into press contact with the coated wire $W_1$ and the terminal member $W_2$ under the action of a pressurizing force from a pressurizing unit 24.

The upper electrode 54 is made of a high-heat generating conductor, e.g., molybdenum or tungsten alloy. The upper electrode 54 may be of any shape, but is preferably substantially U or V shaped with a pair of legs 54c and 54d whose upper ends act as the electrode terminals 54a and 54b, respectively, the legs 54c and 54d having a lower end connection acting as an electrode extremity 54e that comes into press contact with the workpiece. It will suffice to make at least the electrode extremity 54e and its vicinity of a high-heat generating material, with the remaining portions made of a low-heat generating material (e.g., copper alloy).

The lower electrode 56 is made of a conductor having a high conductivity, e.g., a copper alloy and may be of any shape, e.g., ordinary cylindrical or tubular shape, whose upper end can act as the electrode extremity. The upper electrode 54 and the lower electrode 56 are fitted to an upper electrode support member 58 and a lower electrode support member 60, respectively.

FIG. 10 illustrates a specific example of the joining head 52 for use in this embodiment. The upper electrode support member 58 comprises a vertical arm 61 operatively coupled to a pressurizing drive unit (e.g., air cylinder) not shown and a pair of horizontal arms 62 and 64 integrally secured via an insulator to a lower end of the vertical arm 61. The electrode terminals 54a and 54b of the upper electrode 54 are detachably fitted to fore-ends (front side) of the horizontal arms 62 and 64, respectively, by means of bolts 66 and 68, respectively. Conductor plates 70 and 72 from the power supply output terminals $N_0$ and $N_1$ (FIG. 9), respectively, are coupled to rear ends (backside) of the horizontal arms 62 and 64, respectively. The horizontal arms 62 and 64 are made of an electrically conductive material, e.g., aluminum or copper alloy. The horizontal arms 62 and 64 are physically coupled together by means of bolts not shown but electrically insulated from each other by way of an insulator 74. The horizontal arms 62 and 64 in cooperation make up a part of the upper electrode support member 58 and form parts of secondary conductors 76 and 78 (FIG. 9) extending from the power supply output terminals $N_0$ and $N_1$ to the electrode terminals 54a and 54b, respectively, of the upper electrode 54.

In the upper electrode 54 as well, the terminals 54a and 54b or the legs 54c and 54d are electrically insulated from each other by way of an insulator 80, with the lower ends of the legs 54c and 54d being integrally continuous with each other in the vicinity of the electrode extremity 54e.

The lower electrode support member 60 comprises an electrode holder 82 whose fore-end is split into two pieces 82a and 82b serving to clamp the lower electrode 56 therebetween, the electrode holder 82 being tightened up by a bolt 84 to detachably hold the lower electrode 56 in position. The electrode holder 82 forms a part of a secondary conductor 86 (FIG. 9) extending from the power supply output terminal $N_1$ to the lower electrode 56.

In FIG. 9, the current sensor 32 similar to the first embodiment is fitted to the secondary conductor 86 associated with the lower electrode 56, the current sensor 32 having the output terminal connected to the input terminal of the current detecting circuit 34. When a current $I_B$ flows through the lower electrode 56, the current sensor 32 detects the current $I_B$ and the current detecting circuit 34 feeds to the control unit 40 (FIG. 8) a current detection signal $<I_B>$ indicative of the current value of the current $I_B$.

Similar to the first embodiment described above, this joining apparatus may also employ, as major welding conditions to be set, an upper limit time $WE_1'$, a second current-supplying time $WE_2$, current values $SIa$ and $SIb$ of the first and second current-supplying times $WE_1$ and $WE_2$, respectively, a skip level SK, etc. Then, the current-supplying control may be provided in accordance with a procedure similar to that of FIGS. 3 or 6.

In the joining head 52, immediately after the initiation of the first current-supplying time $WE_1$ the insulator of the coated wire $W_1$ cuts off the conductive path, and hence a secondary current $I_2$ flowing from the power supply output terminal $N_0$ via the secondary conductor 76 into the first terminal 54a of the upper electrode 54 passes through the first leg 54c of the upper electrode 54, the electrode extremity 54e and the conductive path of the second leg 54d, and further from the second terminal 54b through the secondary conductor 78 and back to the power supply output terminal $N_1$. Thus, all of the secondary current $I_2$ results in an upper electrode longitudinal current $I_C$ that flows longitudinally from one end (terminal 54a) of the upper electrode 54 to the other end (terminal 54b) thereof. The upper electrode longitudinal current $I_C$ causes a generation of Joule heat in the legs 54c and 54d of the upper electrode 54 and in the electrode extremity 54e thereof, the resultant Joule heat applying a heat to the insulator of the coated wire $W_1$.

When the thus applied heat melts and removes the insulator of the coated wire $W_1$, the interior conductor becomes exposed. Then, a conductive path is formed through the workpieces ($W_1$, $W_2$) between the upper electrode 54 and the lower electrode 56, allowing a part of the secondary current $I_2$ to flow through the conductive path into the lower electrode 56.

When a lower electrode current $I_B$ passing through the workpieces ($W_1$, $W_2$) starts to flow, the melting and removing of the coated wire insulator is accelerated by the Joule heat generated by the workpieces themselves, leading to an increase in the lower electrode current $I_B$.

Similar to the first embodiment described above, the control unit 40 continues to monitor the value of the current detection signal $<I_B>$ fed from the current detecting circuit 34 from the initiation (point $t_0$) of the first current-supplying time $WE_1$. At point $t_s$ when $<I_1>$ reaches (exceeds) the skip level SK, the control unit 40 terminates the supply of current of the first current-supplying time $WE_1$, and simultaneously or after the elapse of a predefined current OFF time $T_c$, commences the supply of current of the second current-supplying time $WE_2$. Then, during the supply of current of the second current-supplying time $WE_2$, switching is made to the set current value [SIb] for net joining so that the inverter 14 can experience the switching actions under the constant current limiter control (step $A_7$) similar to the above. The supply of current of the second current-supplying time $WE_2$ continues in compliance with the set time. Thus, substantially a constant current flows during the set time through the portion of contact of the coated wire $W_1$ conductor with the terminal member $W_2$, so that stable and satisfactory joining of workpieces ($W_1$, $W_2$) can be achieved.

In this embodiment as well, similar to the above first embodiment, optimum control can be provided of both the current consumed for the removal of the coated wire $W_1$ insulator and the current consumed for the joining of the coated wire $W_1$ conductor in a single current-supplying sequence, thereby achieving an improved joint quality.

By virtue of the configuration of this embodiment upper electrode 54 in the form of a single or integral high-heat generating, electrically conductive member having the first and second terminals 54a and 54b for receiving a heat generation power from the power supply unit and the electrode extremity 54e for press contact with the coated wire $W_1$, constantly stable Joule heat is applied to the coated wire $W_1$ from the electrode extremity 54e upon the removal of the insulator of the coated wire $W_1$, thereby making it possible to reduce any possible variance in the first current-supplying time $WE_1$.

This embodiment may employ a system of monitoring the upper electrode longitudinal current $I_C$ flowing through the secondary conductor 78 in order to judge the degree of progress of the melting and removing of the coated wire $W_1$ insulator during the first current-supplying time $WE_1$. It will suffice in such a case to set an appropriate skip level for the amount of drop in the current value of the upper electrode longitudinal current $I_C$.

This embodiment may also use the lower electrode current $I_B$ as the object of the constant current control or the controlled amount in the supply of current of the second current-supplying time $WE_2$.

The above second embodiment allows the second terminal 54b of the upper electrode 54 to be connected at all times to the power supply output terminal $N_1$ on the zero potential side. Hence, if switching is made from the supply of current of the first current-supplying time $WE_1$ to the supply of current of the second current-supplying time $WE_2$, then the leg 54d providing the second terminal 54b of the upper electrode 54 is excluded from the main conductive path extending between the two electrodes 54 and 56 and will not contribute to the joining of the conductor of the coated wire $W_1$.

However, a third embodiment described below enables both the legs 54c and 54d of the upper electrode 54 to contribute to the joining of the coated wire conductor in the supply of current of the second current-supplying time $WE_2$.

Figure 11:
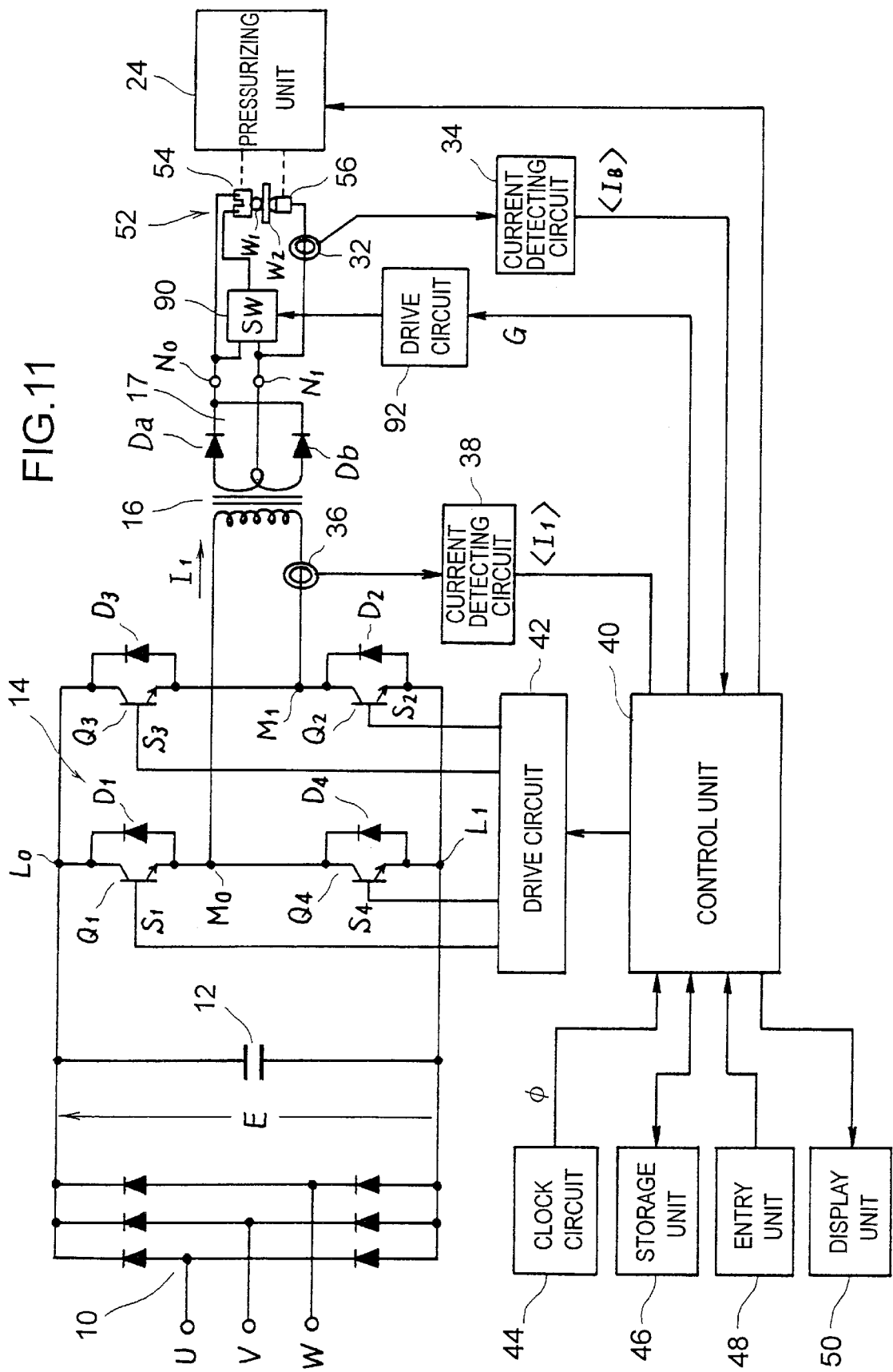
FIG. 11 is a diagram showing a configuration of a joining apparatus in accordance with a third embodiment of the present invention.
Figure 12:
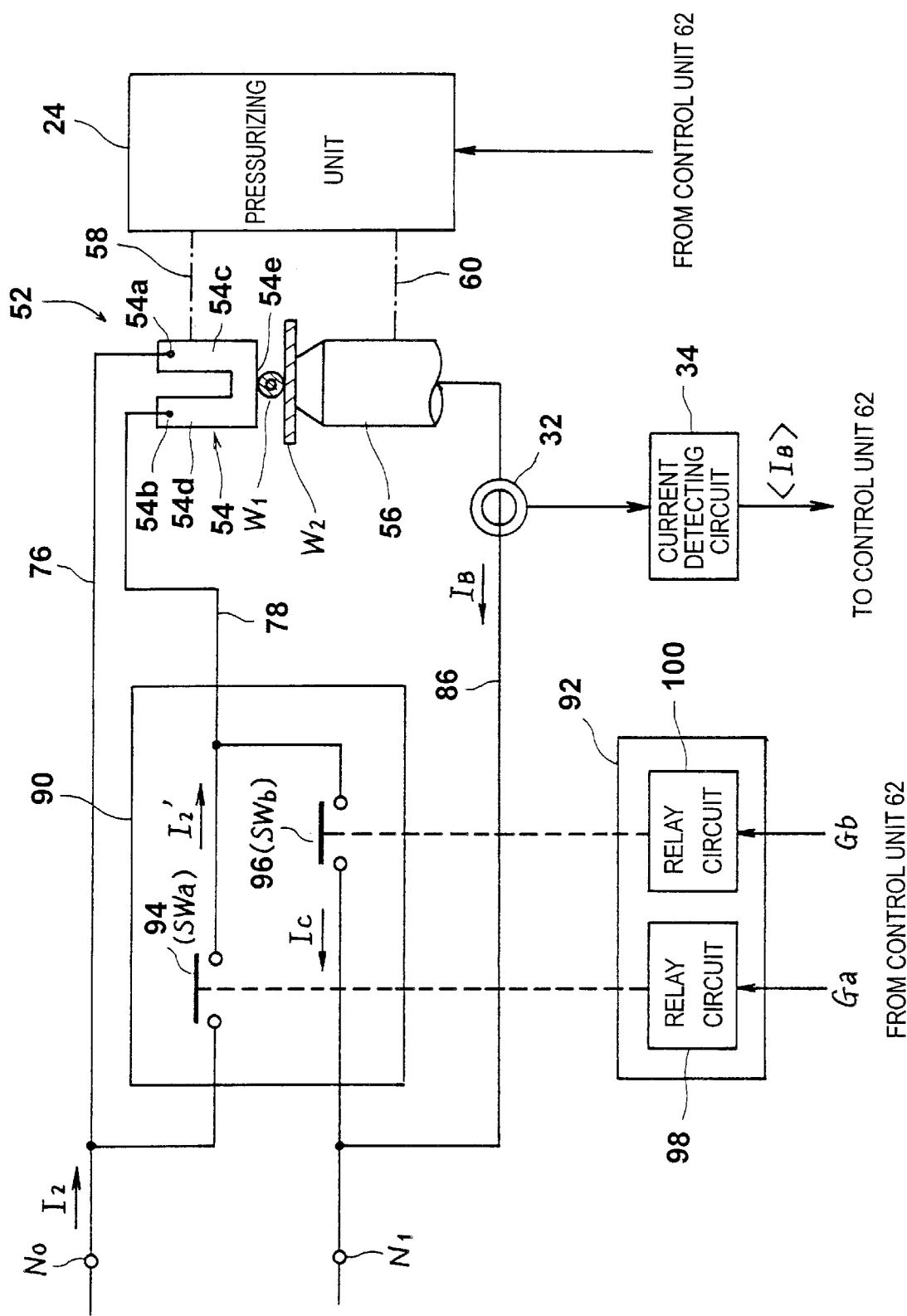
FIG. 12 is an enlarged view of a configuration of a joining head of the joining apparatus in accordance with the third embodiment.

FIGS. 11 and 12 depict the configuration of a joining apparatus in accordance with the third embodiment. In the diagrams, the same reference numerals are imparted to parts having similar configurations or functions to those of the apparatus (FIGS. 8 and 9) of the second embodiment described above.

The third embodiment is characterized by a switching circuit (SW) 90 interposed between the power supply output terminals $N_0$, $N_1$ and the second terminal 54b of the upper electrode 54, the switching circuit (SW) 90 serving to change-over the direction of current through the leg 54d of the upper electrode 54 at a predetermined timing. The switching circuit (SW) 90 is switchingly controlled via a drive circuit 92 by the control unit 40.

FIG. 12 illustrates an example of the configuration of the switching circuit (SW) 90 and the drive circuit 92. The switching circuit (SW) 90 includes a first magnetic switch ($SW_a$) 94 electrically connected between the positive voltage power supply output terminal $N_0$ and the second terminal 54b of the upper electrode 54, and a second magnetic switch ($SW_b$) 96 electrically connected between the zero potential power supply output terminal $N_1$ and the second terminal 54b. The drive circuit 92 includes relay circuits 98 and 100 that correspond to the first and second magnetic switches 94 and 96, respectively. The relay circuits 98 and 100 have their respective relays for changing over movable contacts of the magnetic switches ($SW_a$) 94 and ($SW_b$) 96 between a make (closed) position and a break (open) position in response to switching control signals $G_a$ and $G_b$ from the control unit 40.

Figure 13:
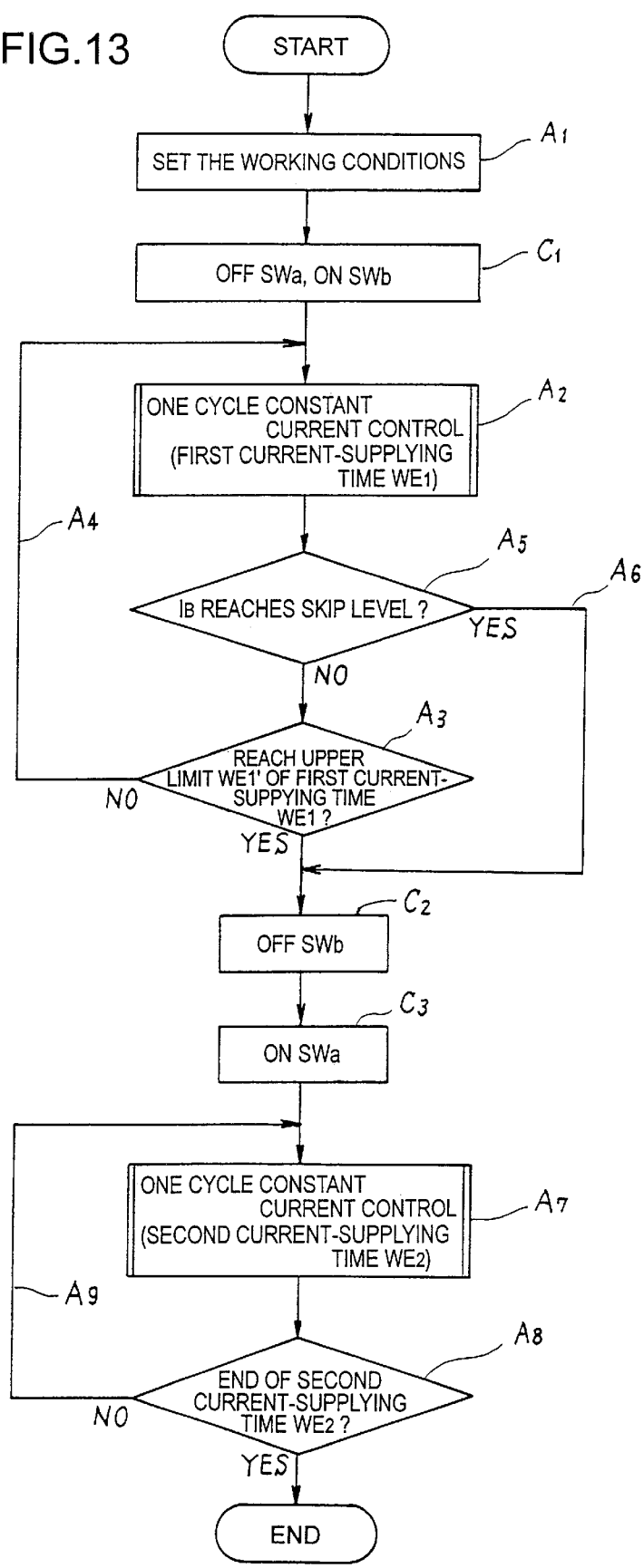
FIG. 13 is a flowchart of a procedure of a current-supplying control effected in the third embodiment.

FIG. 13 illustrates the procedure of current-supplying control effected in the third embodiment. In the diagram, the same reference symbols are imparted to processes similar to those of the current-supplying control procedure (FIG. 4) of the first embodiment. In this procedure, the third embodiment includes additional process steps $C_1$, $C_2$ and $C_3$.

In the third embodiment, upon the initialization immediately before the start of supply of current, the first magnetic switch ($SW_a$) 94 is turned OFF (opened) with the second magnetic switch ($SW_b$) 96 ON (closed), allowing the second terminal 54b of the upper electrode 54 to be in connection with the power supply output terminal $N_1$ on the zero potential side (step $C_1$). As a result, during the supply of current of the first current-supplying time $WE_1$ (steps $A_2 \rightarrow A_3 \rightarrow A_4 \rightarrow A_2 \ldots$), an upper electrode longitudinal current $I_C$ flows through the upper electrode 54 in the same manner as the first embodiment described above.

Once the lower electrode 56 associated electrode current $I_B$ reaches the skip level SK, the control unit 40 first turns OFF (opens) the second magnetic switch ($SW_b$) 96 to cut off the upper electrode longitudinal current $I_C$ (steps $A_5 \rightarrow A_6 \rightarrow C_2$), immediately after which it turns ON (closes) the first magnetic switch ($SW_a$) 94 (step $C_3$). As a result, during the supply of current of the second current-supplying time $WE_2$ (steps $A_7 \rightarrow A_8 \rightarrow A_9 \rightarrow A_7 \ldots$), the secondary current $I_2$ from the positive voltage power supply output terminal can separate into two flows that flow from the terminals 54a and 54b longitudinally through the legs 54c and 54d, respectively, of the upper electrode 54 into the electrode extremity 54e where the two flows join together to be fed to the workpieces ($W_1$, $W_2$).

Figure 14:
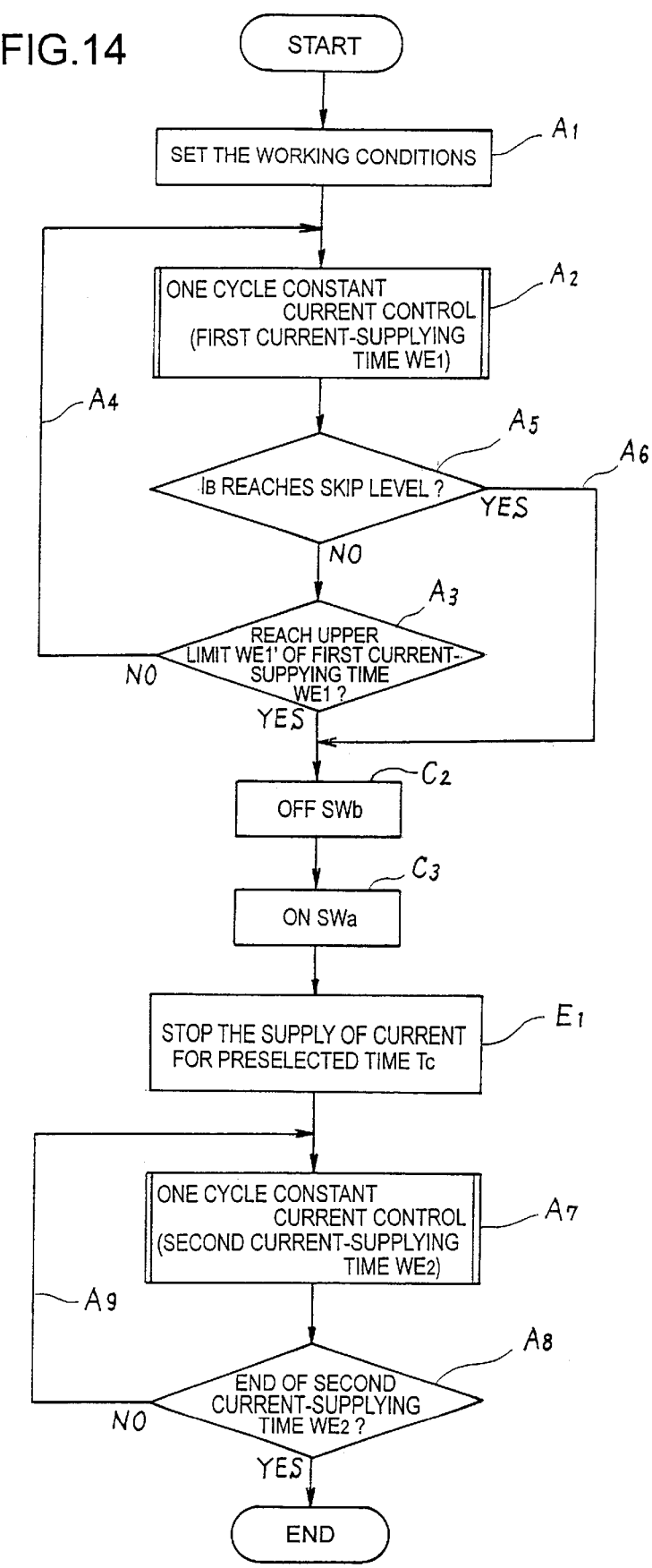
FIG. 14 is a flowchart of another procedure of the current-supplying control effected in the third embodiment.

Alternatively, as shown in FIG. 14, a current off time $T_c$ (step $E_1$) may be inserted between the supply of current of the first current-supplying time $WE_1$ (steps $A_2 \rightarrow A_3 \rightarrow A_4 \rightarrow A_2 \ldots$) and the supply of current of the second current-supplying time $WE_2$ (steps $A_7 \rightarrow A_8 \rightarrow A_9 \rightarrow A_7 \ldots$).

In this manner, upon the supply of current of the second current-supplying time $WE_2$, both the legs 54c and 54d can feed joining current toward the workpieces ($W_1$, $W_2$), thereby achieving a remarkably improved current-supplying efficiency. It is therefore possible to select a large value as the set current value SIa for the supply of current of the second current-supplying time $WE_2$ to shorten the second current-supplying time $WE_2$. Furthermore, meaningless upper electrode longitudinal current $I_C$ will not flow, so that advantages are obtained such as saved power consumption and enhanced constant current control accuracy.

Another system is also feasible in which the switching circuit 90 is provided with only the switch 96 (without the switch 94), the switch 96 being put in closed (ON) state during the first current-supplying time $WE_1$, but in open (OFF) state during the second current-supplying time $WE_2$. In this case as well, during the second current-supplying the $WE_2$, all of the second current $I_2$ will flow through the lower electrode 56, and hence $I_2=I_B$ results.

In the above embodiments, the lower electrode 56 associated current $I_B$ is monitored so that an accurate timing is acquired to make a switching from the supply of current for the removal of the coated wire insulator to the supply of current for the joining of the coated wire conductor. In lieu of such a current-monitoring system, a further system is also possible that monitors the amount of displacement of the movable electrode (upper electrode 54) as shown in FIGS. 15A and 15B.

Referring to FIGS. 15A and 15B, defined as the reference position (initial value) is the height $H_0$ of the upper electrode 54 immediately before the start of the first current-supplying time $WE_1$. The amount of drop is monitored of the upper electrode 54 arising from the melting of the insulator of the coated wire $W_1$ after the start of the first current-supplying time $WE_1$, the amount of drop being expressed as the amount of displacement $\delta h$ from the reference height $H_0$. At the point of time when the amount of displacement $\delta h$ of the electrode reaches the set value, switching is made from the first current-supplying time $WE_1$ to the second current-supplying time $WE_2$.

In this electrode displacement monitoring system, the upper electrode support member for example may be mounted with a position sensor not shown for detecting the height of the upper electrode 54 so that an output signal from the position sensor is fed to the control unit 40 where required signal processing is effected for the above monitoring and switching control.

Yet another system is also feasible that has means not shown for monitoring the voltage between the two terminals 54a and 54b of the upper electrode 54 whereby switching is made from the first current-supplying time $WE_1$ to the second current-supplying time $WE_2$ at the point of time when the inter-terminal voltage has dropped to the set value.

Although the above embodiments have employed as the power supply circuit the DC inverter power-supply circuit by way of example, other various power supply circuits could also be available such as an AC waveform inverter power-supply circuit or a single-phase AC power supply circuit.

Although the above embodiments have effected joining between the coated wire $W_1$ and the terminal member $W_2$, the present invention would also allow for another application jointing a plurality of coated wires together.

What is claimed is:

1. A joining apparatus for joining coated wires each consisting of a conductor covered with an insulator, said apparatus comprising:

first and second electrodes arranged to clamp said coated wires laid one on top of the other or said coated wire and a terminal member laid one on top of the other, to apply a pressure thereto from both sides;

a power supply circuit having first and second output terminals electrically connected to said first and second electrodes, respectively, said power supply circuit supplying a main current to an electrically conductive path extending between said first and second output terminals;

a third electrode having a portion in intimate contact with a fore-end of said first electrode, said third electrode electrically connected to said second output terminal of said power supply circuit;

current monitoring means monitoring a current flowing through said second electrode and detecting a timing when a current value of said current has reached a predefined level; and current control means providing a control of said power supply circuit so as to allow said main current to be substantially coincident with a first current set value for melting and removing of said insulator during a first current-supplying time starting from the initiation of the supply of current and ending by the detection of said timing, said current control means providing a control of said power supply circuit so as to allow said main current to be substantially coincident with a second current set value for joining said conductor and said terminal member together during a second current-supplying time starting from the detection of said timing and ending by the termination of the supply of current.

2. A joining apparatus for joining coated wires each consisting of a conductor covered with an insulator, said apparatus comprising:

first and second electrodes arranged to clamp said coated wires laid one on top of the other or said coated wire and a terminal member laid one on top of the other, to apply a pressure thereto from both sides;

a power supply circuit having first and second output terminals electrically connected to said first and second electrodes, respectively, said power supply circuit supplying a main current to an electrically conductive path extending between said first and second output terminals;

a third electrode having a portion in intimate contact with a fore-end of said first electrode, said third electrode electrically connected to said second output terminal of said power supply circuit;

current monitoring means monitoring a current flowing through said second electrode and detecting a timing when a current value of said current has reached a predefined level; and current control means providing a control of said power supply circuit so as to allow said main current to be substantially coincident with a first current set value for melting and removing of said insulator during a first current-supplying time starting from the initiation of the supply of current and ending by the detection of said timing, said current control means providing a control of said power supply circuit so as to allow said main current to be substantially coincident with a second current set value for joining said conductor and said terminal member together during a second current-supplying time starting after the elapse of a predefined current OFF time following the detection of said timing and ending by the termination of the supply of current.

3. A joining apparatus for joining coated wires each consisting of a conductor covered with an insulator, said apparatus comprising:

first and second electrodes arranged to clamp said coated wires laid one on top of the other or said coated wire and a terminal member laid one on top of the other, to apply a pressure thereto from both sides;

a power supply circuit having first and second output terminals electrically connected to said first and second electrodes, respectively, said power supply circuit supplying a main current to an electrically conductive path extending between said first and second output terminals;

a third electrode having a portion in intimate contact with a fore-end of said first electrode, said third electrode electrically connected to said second output terminal of said power supply circuit;

current monitoring means monitoring a current flowing through said third electrode and detecting a timing when a current value of said current has reduced to a predefined level; and current control means providing a control of said power supply circuit so as to allow said main current to be substantially coincident with a first current set value for melting and removing of said insulator during a first current-supplying time starting from the initiation of the supply of current and ending by the detection of said timing, said current control means providing a control of said power supply circuit so as to allow said main current to be substantially coincident with a second current set value for joining said conductor and said terminal member together during a second current-supplying time starting from the detection of said timing and ending by the termination of the supply of current.

4. A joining apparatus for joining coated wires each consisting of a conductor covered with an insulator, said apparatus comprising:

first and second electrodes arranged to clamp said coated wires laid one on top of the other or said coated wire and a terminal member laid one on top of the other, to apply a pressure thereto from both sides;

a power supply circuit having first and second output terminals electrically connected to said first and second electrodes, respectively, said power supply circuit supplying a main current to an electrically conductive path extending between said first and second output terminals;

a third electrode having a portion in intimate contact with a fore-end of said first electrode, said third electrode electrically connected to said second output terminal of said power supply circuit;

current monitoring means monitoring a current flowing through said third electrode and detecting a timing when a current value of said current has reduced to a predefined level; and current control means providing a control of said power supply circuit so as to allow said main current to be substantially coincident with a first current set value for melting and removing of said insulator during a first current-supplying time starting from the initiation of the supply of current and ending by the detection of said timing, said current control means providing a control of said power supply circuit so as to allow said main current to be substantially coincident with a second current set value for joining said conductor and said terminal member together during a second current-supplying time starting after the elapse of a predefined current OFF time following the detection of said timing and ending by the termination of the supply of current.

5. A joining apparatus for joining coated wires each consisting of a conductor covered with an insulator, said apparatus comprising:

first and second electrodes arranged to clamp said coated wires laid one on top of the other or said coated wire and a terminal member laid one on top of the other, to apply a pressure thereto from both sides;

a power supply circuit having first and second output terminals electrically connected to said first and second electrodes, respectively, said power supply circuit supplying a main current to an electrically conductive path extending between said first and second output terminals;

a third electrode having a portion in intimate contact with a fore-end of said first electrode, said third electrode electrically connected to said second output terminal of said power supply circuit;

current monitoring means monitoring a current flowing through said second electrode and detecting a timing when a current value of said current has reached a predefined level; and current control means providing a control of said power supply circuit so as to allow said main current to be substantially coincident with a first current set value for melting and removing of said insulator during a first current-supplying time starting from the initiation of the supply of current and ending by the detection of said timing, said current control means providing a control of said power supply circuit so as to allow said current flowing through said second electrode to be substantially coincident with a second current set value for joining said conductor and said terminal member together during a second current-supplying time starting from the detection of said timing and ending by the termination of the supply of current.

6. A joining apparatus for joining coated wires each consisting of a conductor covered with an insulator, said apparatus comprising:

first and second electrodes arranged to clamp said coated wires laid one on top of the other or said coated wire and a terminal member laid one on top of the other, to apply a pressure thereto from both sides;

a power supply circuit having first and second output terminals electrically connected to said first and second electrodes, respectively, said power supply circuit supplying a main current to an electrically conductive path extending between said first and second output terminals;

a third electrode having a portion in intimate contact with a fore-end of said first electrode, said third electrode electrically connected to said second output terminal of said power supply circuit;

current monitoring means monitoring a current flowing through said second electrode and detecting a timing when a current value of said current has reached a predefined level; and current control means providing a control of said power supply circuit so as to allow said main current to be substantially coincident with a first current set value for melting and removing of said insulator during a first current-supplying time starting from the initiation of the supply of current and ending by the detection of said timing, said current control means providing a control of said power supply circuit so as to allow said current flowing through said second electrode to be substantially coincident with a second current set value for joining said conductor and said terminal member together during a second current-supplying time starting after the elapse of a predefined current OFF time following the detection of said timing and ending by the termination of the supply of current.

7. A joining apparatus for joining coated wires each consisting of a conductor covered with an insulator, said apparatus comprising:

first and second electrodes arranged to clamp said coated wires laid one on top of the other or said coated wire and a terminal member laid one on top of the other, to apply a pressure thereto from both sides;

a power supply circuit having first and second output terminals electrically connected to said first and second electrodes, respectively, said power supply circuit supplying a main current to an electrically conductive path extending between said first and second output terminals;

a third electrode having a portion in intimate contact with a fore-end of said first electrode, said third electrode electrically connected to said second output terminal of said power supply circuit;

current monitoring means monitoring a current flowing through said third electrode and detecting a timing when a current value of said current has reduced to a predefined level; and current control means providing a control of said power supply circuit so as to allow said main current to be substantially coincident with a first current set value for melting and removing of said insulator during a first current-supplying time starting from the initiation of the supply of current and ending by the detection of said timing, said current control means providing a control of said power supply circuit so as to allow said current flowing through said second electrode to be substantially coincident with a second current set value for joining said conductor and said terminal member together during a second current-supplying time starting from the detection of said timing and ending by the termination of the supply of current.

8. A joining apparatus for joining coated wires each consisting of a conductor covered with an insulator, said apparatus comprising:

first and second electrodes arranged to clamp said coated wires laid one on top of the other or said coated wire and a terminal member laid one on top of the other, to apply a pressure thereto from both sides;

a power supply circuit having first and second output terminals electrically connected to said first and second electrodes, respectively, said power supply circuit supplying a main current to an electrically conductive path extending between said first and second output terminals;

a third electrode having a portion in intimate contact with a fore-end of said first electrode, said third electrode electrically connected to said second output terminal of said power supply circuit;

current monitoring means monitoring a current flowing through said third electrode and detecting a timing when a current value of said current has reduced to a predefined level; and current control means providing a control of said power supply circuit so as to allow said main current to be substantially coincident with a first current set value for melting and removing of said insulator during a first current-supplying time starting from the initiation of the supply of current and ending by the detection of said timing, said current control means providing a control of said power supply circuit so as to allow said current flowing through said second electrode to be substantially coincident with a second current set value for joining said conductor and said terminal member together during a second current-supplying time starting after the elapse of a predefined current OFF time following the detection of said timing and ending by the termination of the supply of current.

9. A joining apparatus for joining together a pair of members to be joined that are laid one on top of the other, at least one of said pair of members being a coated wire, said apparatus comprising:

a power supply circuit having first and second output terminals and supplying a main current to an electrically conductive path extending between said first and second output terminals;

a first electrode formed of an electrically conductive, high-heat generating member having first and second terminals electrically connected to said first and second output terminals, respectively, of said power supply circuit, said first electrode having a fore-end between said first and second terminals, said fore-end coming into contact with one of said pair of members to be joined with a predetermined pressurizing force;

a second electrode electrically connected to said second output terminal of said power supply circuit and coming into contact with the other of said pair of members to be joined with a predetermined pressurizing force;

current monitoring means monitoring a current flowing through a path extending between said second electrode and said second output terminal of said power supply circuit, said current monitoring means detecting a timing when a current value of said current has reached a predefined level; and current control means providing a control of said power supply circuit so as to allow said main current to be substantially coincident with a first current set value for melting and removing of said insulator during a first current-supplying time starting from the initiation of the supply of current and ending by the detection of said timing, said current control means providing a control of said power-supply circuit so as to allow said main current to be substantially coincident with a second current set value for joining during a second current-supplying time starting from the detection of said timing and ending by the termination of the supply of current.

10. The joining apparatus according to claim 9, further comprising:

a first switch disposed between said first output terminal of said power supply circuit and said second terminal of said first electrode;

a second switch disposed between said second output terminal of said power supply circuit and said second terminal of said first electrode; and switching control means, during said first current-supplying time, keeping said first switch open but said second switch closed, said switching control means, during said second current-supplying time, keeping said second switch open but said first switch closed.

11. The joining apparatus according to claim 9, further comprising:

a switch disposed between said second output terminal of said power supply circuit and said second terminal of said first electrode; and switching control means keeping said switch closed during said first current-supplying time, but open during said second current-supplying time.

12. A joining apparatus for joining together a pair of members to be joined that are laid one on top of the other, at least one of said pair of members being a coated wire, said apparatus comprising:
- a power supply circuit having first and second output terminals and supplying a main current to an electrically conductive path extending between said first and second output terminals;
- a first electrode formed of an electrically conductive, high-heat generating member having first and second terminals electrically connected to said first and second output terminals, respectively, of said power supply circuit, said first electrode having a fore-end between said first and second terminals, said fore-end coming into contact with one of said pair of members to be joined with a predetermined pressurizing force;
- a second electrode electrically connected to said second output terminal of said power supply circuit and coming into contact with the other of said pair of members to be joined with a predetermined pressurizing force;
- current monitoring means monitoring a current flowing through a path extending between said second electrode and said second output terminal of said power supply circuit, said current monitoring means detecting a timing when a current value of said current has reached a predefined level; and
- current control means providing a control of said power supply circuit so as to allow said main current to be substantially coincident with a first current set value for melting and removing of said insulator during a first current-supplying time starting from the initiation of the supply of current and ending by the detection of said timing, said current control means providing a control of said power supply circuit so as to allow said main current to be substantially coincident with a second current set value for joining during a second current-supplying time starting after the elapse of a predefined current OFF time following the detection of said timing and ending by the termination of the supply of current.

13. A joining apparatus for joining together a pair of members to be joined that are laid one on top of the other, at least one of said pair of members being a coated wire, said apparatus comprising:
- a power supply circuit having first and second output terminals and supplying a main current to an electrically conductive path extending between said first and second output terminals;
- a first electrode formed of an electrically conductive, high-heat generating member having first and second terminals electrically connected to said first and second output terminals, respectively, of said power supply circuit, said first electrode having a fore-end between said first and second terminals, said fore-end coming into contact with one of said pair of members to be joined with a predetermined pressurizing force;
- a second electrode electrically connected to said second output terminal of said power supply circuit and coming into contact with the other of said pair of members to be joined with a predetermined pressurizing force;
- current monitoring means monitoring a current flowing through a path extending between said second terminal of said first electrode and said second output terminal of said power supply circuit, said current monitoring means detecting a timing when a current value of said current has reached a predefined level; and
- current control means providing a control of said power supply circuit so as to allow said main current to be substantially coincident with a first current set value for melting and removing of said insulator during a first current-supplying time starting from the initiation of the supply of current and ending by the detection of said timing, said current control means providing a control of said power-supply circuit so as to allow said main current to be substantially coincident with a second current set value for joining during a second current-supplying time starting from the detection of said timing and ending by the termination of the supply of current.

14. A joining apparatus for joining together a pair of members to be joined that are laid one on top of the other, at least one of said pair of members being a coated wire, said apparatus comprising:
- a power supply circuit having first and second output terminals and supplying a main current to an electrically conductive path extending between said first and second output terminals;
- a first electrode formed of an electrically conductive, high-heat generating member having first and second terminals electrically connected to said first and second output terminals, respectively, of said power supply circuit, said first electrode having a fore-end between said first and second terminals, said fore-end coming into contact with one of said pair of members to be joined with a predetermined pressurizing force;
- a second electrode electrically connected to said second output terminal of said power supply circuit and coming into contact with the other of said pair of members to be joined with a predetermined pressurizing force;
- current monitoring means monitoring a current flowing through a path extending between said second terminal of said first electrode and said second output terminal of said power supply circuit, said current monitoring means detecting a timing when a current value of said current has reached a predefined level; and
- current control means providing a control of said power supply circuit so as to allow said main current to be substantially coincident with a first current set value for melting and removing of said insulator during a first current-supplying time starting from the initiation of the supply of current and ending by the detection of said timing, said current control means providing a control of said power supply circuit so as to allow said main current to be substantially coincident with a second current set value for joining during a second current-supplying time starting after the elapse of a predefined current OFF time following the detection of said timing and ending by the termination of the supply of current.

* * * * *